(12) United States Patent
Melconian et al.

(10) Patent No.: US 8,477,068 B2
(45) Date of Patent: Jul. 2, 2013

(54) SYSTEMS AND METHODS FOR ALIGNMENT WITH A REMOTE SOURCE

(75) Inventors: Arsen Melconian, Northridge, CA (US); Daniel Lawrence Cordell, Ventura, CA (US); Douglas Kent Lafreniere, Simi Valley, CA (US); Steven Ow, Santa Rosa Valley, CA (US)

(73) Assignee: Tecom Industries, Inc., Thousand Oaks, CA (US)

(*) Notice: Subject to any disclaimer, the term of this patent is extended or adjusted under 35 U.S.C. 154(b) by 245 days.

(21) Appl. No.: 12/770,700

(22) Filed: Apr. 29, 2010

(65) Prior Publication Data

US 2011/0057838 A1  Mar. 10, 2011

Related U.S. Application Data

(60) Provisional application No. 61/174,379, filed on Apr. 30, 2009.

(51) Int. Cl.
*H01Q 3/00* (2006.01)

(52) U.S. Cl.
USPC ............................................ 342/359; 342/432

(58) Field of Classification Search
USPC .................................................. 342/359, 432
See application file for complete search history.

(56) References Cited

U.S. PATENT DOCUMENTS

| 5,912,642 A | 6/1999 | Coffin et al. |
| 6,208,307 B1 | 3/2001 | Frisco et al. |
| 6,657,588 B2 * | 12/2003 | Strickland et al. ............ 342/359 |

FOREIGN PATENT DOCUMENTS

WO    WO 03/094287    11/2003

OTHER PUBLICATIONS

International Search Report, PCT/US2010/033136, Sep. 23, 2010 (3 pages).

\* cited by examiner

*Primary Examiner* — Cassie Galt
(74) *Attorney, Agent, or Firm* — Finnegan, Henderson, Farabow, Garrett & Dunner, L.L.P.

(57) ABSTRACT

Systems and methods for monitoring, testing, and controlling alignment are provided, including an antenna assembly with an antenna and a receiver, the antenna configured to receive signals from a remote source, the receiver coupled to the antenna and configured to generate signal strength values associated with the signals from the remote source, and where the antenna assembly exhibits an azimuthal alignment relative to an axis determined by the antenna assembly and the remote source. Systems and methods provided herein further generate a first coarse-grained signal strength value from set of signal strength values generated by the receiver while the antenna assembly is at a first azimuthal alignment offset, and generate a measure that the first azimuthal alignment offset is at least one of: less than a predetermined azimuthal alignment offset, approximately equal to the predetermined azimuthal alignment offset, and greater than the predetermined azimuthal alignment magnitude.

49 Claims, 8 Drawing Sheets

SYSTEMS AND METHODS FOR ALIGNMENT WITH A REMOTE SOURCE

CROSS REFERENCE TO RELATED APPLICATIONS

This application claims the benefit of U.S. Provisional Application No. 61/174,379, filed Apr. 30, 2009, the contents of which are incorporated herein by reference.

DESCRIPTION

1. Field

This disclosure relates to systems and methods for monitoring, testing, controlling, and adjusting the alignment of an assembly relative to a remote source of radiofrequency radiation. Particular embodiments relate to such systems and processes for antenna assemblies affixed to vehicles, such as, for example, systems and processes for an antenna assembly affixed to an airplane. Further particular embodiments relate to systems and processes for monitoring, testing, controlling, and adjusting the alignment of a receive-only and/or a receive-and-transmit antenna assembly relative to a remote antenna assembly, such as a remote antenna assembly affixed to a communications satellite.

2. Background

Antenna assemblies may be affixed to vehicles, such as airplanes, and configured to receive signals from a remote antenna assembly to provide services to the occupants of the vehicle during transit. For example, an antenna assembly may be configured to receive signals from a satellite. The satellite that is the source of the signals may be one that amplifies and redirects a received signal itself, or a satellite that intercepts a signal at a first frequency and retransmits at a second frequency. Particular examples of satellites that may be a source of signals to provide services include satellites associated with satellite radio services and satellites that offer broadcast television and pay-per-view channels. Such antenna assemblies configured to receive satellite radio and satellite television signals are conventionally non-transmitting antenna assemblies (i.e., a non-transmitting antenna assembly is one that is configured to receive signals from the remote antenna assembly, rather than being also configured to transmit signals back to the remote antenna assembly). When installed on an aircraft, such an antenna assembly may be used to provide in-flight entertainment services to airplane passengers.

In contrast, services offered to the occupants of a vehicle that offer active two-way communications, such as receiving and sending emails, actively browsing the internet, or other forms of communication, and that are channeled through an antenna assembly that is affixed to a vehicle, require the antenna assembly to be configured to also transmit signals to a remote antenna assembly.

The use of mobile antenna assemblies to transmit radiofrequency radiation to a remote target antenna assembly is regulated by the Federal Communications Commission (FCC). Exemplary regulation provides that earth stations on vessels (ESVs) that transmit in the 5925-6425 MHz (earth-to-space) frequency band to a geostationary satellite must maintain "a pointing error of less than 0.2° between the orbital location of the target satellite and the axis of the main lobe of the ESV antenna." 47 C.F.R. 25.221(a)(1)(ii)(A). If the pointing error exceeds plus or minus 0.2 degrees—such as may occur when an antenna assembly is in motion—it may be required that transmissions from the antenna assembly are halted. For example, FCC regulations state that "all emissions from the ESV shall automatically cease within 100 milliseconds if the angle between the orbital location of the target satellite and the axis of the main lobe of the ESV antenna exceeds 0.5°, and transmission will not resume until such angle is less than or equal to 0.2°." 47 C.F.R. 25.221(a)(1)(iii)(A). Halting transmissions between the antenna assembly and the radio signal source may incur service disruptions and, therefore, inconvenience aircraft passengers.

There is a need, accordingly, for a system and method that tests, controls, and adjusts the alignment of an assembly (such as an antenna assembly) relative to a remote antenna assembly, such as a remote source of radiofrequency radiation.

SUMMARY

In one aspect, the present disclosure is directed to a method for monitoring antenna alignment. The method may include providing an antenna assembly comprising an antenna and a receiver, the antenna configured to couple to radiofrequency radiation transmitted from a radiofrequency signal source, the receiver further coupled to the antenna to generate a plurality of signal strength values associated with the radiofrequency radiation coupled to the antenna, the antenna assembly configured to exhibit an azimuthal alignment relative to a positional axis determined by the antenna assembly and the radiofrequency signal source. The method may also include acquiring a first set of signal strength values from the plurality of signal strength values generated by the receiver at a sampling frequency, where the first set of signal strength values are acquired while the antenna assembly is configured to exhibit a first azimuthal alignment magnitude relative to the positional axis, and where the sampling frequency has an associated time period. The method may also include generating a first coarse-grained signal strength value from the first set of signal strength values by smoothing at least a first subset of elements of the first set of signal strength values over a coarse-grained time period that is greater than the time period associated with the sampling frequency. The method may also include acquiring a second set of signal strength values from the plurality of signal strength values generated by the receiver at the sampling frequency, where the second set of signal strength values are acquired while the antenna assembly is at a second azimuthal alignment magnitude relative to the positional axis. The method may also include generating a second coarse-grained signal strength value from the second set of signal strength values by smoothing at least a second subset of elements of the second set of signal strength values over the coarse-grained time period. The method may also include comparing the second coarse-grained signal strength value with the first coarse-grained signal strength value and determining whether the second azimuthal alignment magnitude is at least one of: greater than the first azimuthal alignment magnitude, approximately equal to the first azimuthal alignment magnitude, and less than the first azimuthal alignment magnitude.

In another aspect, the present disclosure is directed to a method for monitoring antenna alignment. The method may include generating a first coarse-grained signal strength value from a plurality of signal strength values while an antenna assembly is configured to exhibit a first azimuthal alignment magnitude relative to a positional axis. The antenna assembly may include an antenna and a receiver, the antenna configured to couple to radiofrequency radiation transmitted from a radiofrequency signal source, the receiver further coupled to the antenna to generate the plurality of signal strength values associated with the radiofrequency radiation coupled to the antenna, the antenna assembly configured to exhibit an azimuthal alignment relative to the positional axis determined by the antenna assembly and the radiofrequency signal source. The method may also include generating a second coarse-grained signal strength value from the plurality of signal strength values while the antenna assembly is configured to exhibit a second azimuthal alignment magnitude relative to the positional axis. The method may also include comparing the second coarse-grained signal strength value with the first coarse-grained signal strength value and determining whether the second azimuthal alignment magnitude is at least one of: greater than the first azimuthal alignment magnitude, approximately equal to the first azimuthal alignment magnitude, and less than the first azimuthal alignment magnitude.

An additional aspect of the present disclosure is directed to a method of aligning an antenna. The method may include monitoring alignment of the antenna. The method may also include providing a controller, responsive to alignment instructions, configured to cause the antenna assembly to exhibit a provisional azimuthal alignment magnitude relative to the positional axis that is different from the second azimuthal alignment magnitude. The method may also include where, if it is determined that the second azimuthal alignment magnitude is greater than the first azimuthal alignment magnitude, providing alignment instructions to the controller configured to cause the antenna assembly to exhibit the provisional azimuthal alignment magnitude.

An additional aspect of the present disclosure is directed to an alignment system. The system may include an antenna assembly comprising an antenna and a receiver, the antenna configured to couple to radiofrequency radiation transmitted from a radiofrequency signal source, the receiver further coupled to the antenna to generate a plurality of signal strength values associated with the radiofrequency radiation coupled to the antenna, the antenna assembly configured to exhibit an azimuthal alignment relative to a positional axis determined by the antenna assembly and the radiofrequency signal source. The system may further include a coarse-grained calculator configured to acquire a first set of signal strength values from the plurality of signal strength values generated by the receiver at a sampling frequency and to generate at least a first coarse-grained signal strength value, where the first set of signal strength values are generated by the receiver while the antenna assembly is at a first azimuthal alignment magnitude relative to the positional axis. The system may further include an alignment calculator configured to use the first coarse-grained signal strength value and to generate a first measure that the first azimuthal alignment magnitude is at least one of: less than a predetermined azimuthal alignment magnitude relative to the positional axis, approximately equal to the predetermined azimuthal alignment magnitude, and greater than the predetermined azimuthal alignment magnitude.

An additional aspect of the present disclosure is directed to a further alignment system. The system may include an antenna assembly comprising an antenna and a receiver, the antenna configured to couple to radiofrequency radiation transmitted from a radiofrequency signal source, the receiver further coupled to the antenna to generate a plurality of signal strength values associated with the radiofrequency radiation coupled to the antenna, the antenna assembly configured to exhibit an azimuthal alignment relative to a positional axis determined by the antenna assembly and the radiofrequency signal source. The system may further include a coarse-grained calculator configured to generate at least a first coarse-grained signal strength value from the plurality of signal strength values as a function of time while the antenna assembly is at a first azimuthal alignment magnitude relative to the positional axis. The system may further include an alignment calculator configured to use the first coarse-grained signal strength value and to generate a first measure that the first azimuthal alignment magnitude is at least one of: less than a predetermined azimuthal alignment magnitude relative to the positional axis, approximately equal to the predetermined azimuthal alignment magnitude, and greater than the predetermined azimuthal alignment magnitude.

Further still, an additional aspect of the present disclosure is directed to a further alignment system. The system may include an antenna assembly comprising an antenna and a modem, the antenna configured to couple to radiofrequency radiation transmitted from a radiofrequency signal source, the modem further coupled to the antenna to generate a plurality of received signal strength values associated with the radiofrequency radiation coupled to the antenna, the antenna assembly configured to exhibit an azimuthal alignment relative to a positional axis determined by the antenna assembly and the radiofrequency signal source. The system may further include a coarse-grained calculator configured to generate at least a first coarse-grained signal strength value from the plurality of received signal strength associated with the antenna assembly at a first azimuthal alignment magnitude relative to the positional axis. The system may further include an alignment calculator configured to use the first coarse-grained signal strength value and to generate a first measure that the first azimuthal alignment magnitude is at least one of: less than a predetermined azimuthal alignment magnitude relative to the positional axis, approximately equal to the predetermined azimuthal alignment magnitude, and greater than the predetermined azimuthal alignment magnitude.

An additional aspect of the present disclosure is directed to a computer-readable storage medium including instructions, executable by a processor, for performing a method of monitoring alignment in an antenna assembly. The antenna assembly may include an antenna and a receiver, the antenna configured to couple to radiofrequency radiation transmitted from a radiofrequency signal source, the receiver further coupled to the antenna to generate a plurality of signal strength values associated with the radiofrequency radiation coupled to the antenna, the antenna assembly configured to exhibit an azimuthal alignment relative to a positional axis determined by the antenna assembly and the radiofrequency signal source. The method of monitoring alignment may include acquiring a first set of signal strength values from the plurality of signal strength values generated by the receiver at a sampling frequency, where the first set of signal strength values are acquired while the antenna assembly is configured to exhibit a first azimuthal alignment magnitude relative to the positional axis, and where the sampling frequency has an associated time period. The method of monitoring alignment may also include generating a first coarse-grained signal strength value from the first set of signal strength values by smoothing at least a first subset of elements of the first set of signal strength values over a coarse-grained time period that is greater than the time period associated with the sampling frequency. The method of monitoring alignment may also include acquiring a second set of signal strength values from the plurality of signal strength values generated by the receiver at the sampling frequency, where the second set of signal strength values are acquired while the antenna assembly is at a second azimuthal alignment magnitude relative to the positional axis. The method of monitoring alignment may also include generating a second coarse-grained signal strength value from the second set of signal strength values by smoothing at least a second subset of elements of the second set of signal strength values over the coarse-grained time period. The method of monitoring alignment may also include comparing the second coarse-grained signal strength value with the first coarse-grained signal strength value and determining whether the second azimuthal alignment magnitude is at least one of: greater than the first azimuthal alignment magnitude, approximately equal to the first azimuthal alignment magnitude, and less than the first azimuthal alignment magnitude.

An additional aspect of the present disclosure is directed to a further computer-readable storage medium including instructions, executable by a processor, for performing a method of monitoring alignment in an antenna assembly. The antenna assembly may include an antenna and a receiver, the antenna configured to couple to radiofrequency radiation transmitted from a radiofrequency signal source, the receiver further coupled to the antenna to generate a plurality of signal strength values associated with the radiofrequency radiation coupled to the antenna, the antenna assembly configured to exhibit an azimuthal alignment relative to a positional axis determined by the antenna assembly and the radiofrequency signal source. The method of monitoring may include generating a first coarse-grained signal strength value from a plurality of signal strength values while an antenna assembly is configured to exhibit a first azimuthal alignment magnitude relative to a positional axis. The method may further include generating a second coarse-grained signal strength value from the plurality of signal strength values while the antenna assembly is configured to exhibit a second azimuthal alignment magnitude relative to the positional axis. The method may additionally compare the second coarse-grained signal strength value with the first coarse-grained signal strength value and determine whether the second azimuthal alignment magnitude is at least one of: greater than the first azimuthal alignment magnitude, approximately equal to the first azimuthal alignment magnitude, and less than the first azimuthal alignment magnitude.

Additional objects and advantages will be set forth in part in the description which follows, being apparent from the description of or can be learned by practice of the disclosed embodiments. The features and advantages will be realized and attained by means of the elements and combinations particularly pointed out in the appended claims.

It is to be understood that both the foregoing general description and the following detailed description are exemplary and explanatory only and are not restrictive of the scope of the inventions, as claimed.

BRIEF DESCRIPTION OF THE DRAWINGS

The accompanying drawings, which are incorporated in and constitute a part of this specification, illustrate embodiments and, together with the description, serve to explain the features, advantages, and principles of the disclosed embodiments.

DETAILED DESCRIPTION

Reference will now be made in detail to the present exemplary embodiments, an examples of which is illustrated in the accompanying drawings. Wherever possible, the same reference numbers will be used throughout the drawings to refer to the same or like parts.

Figure 1:
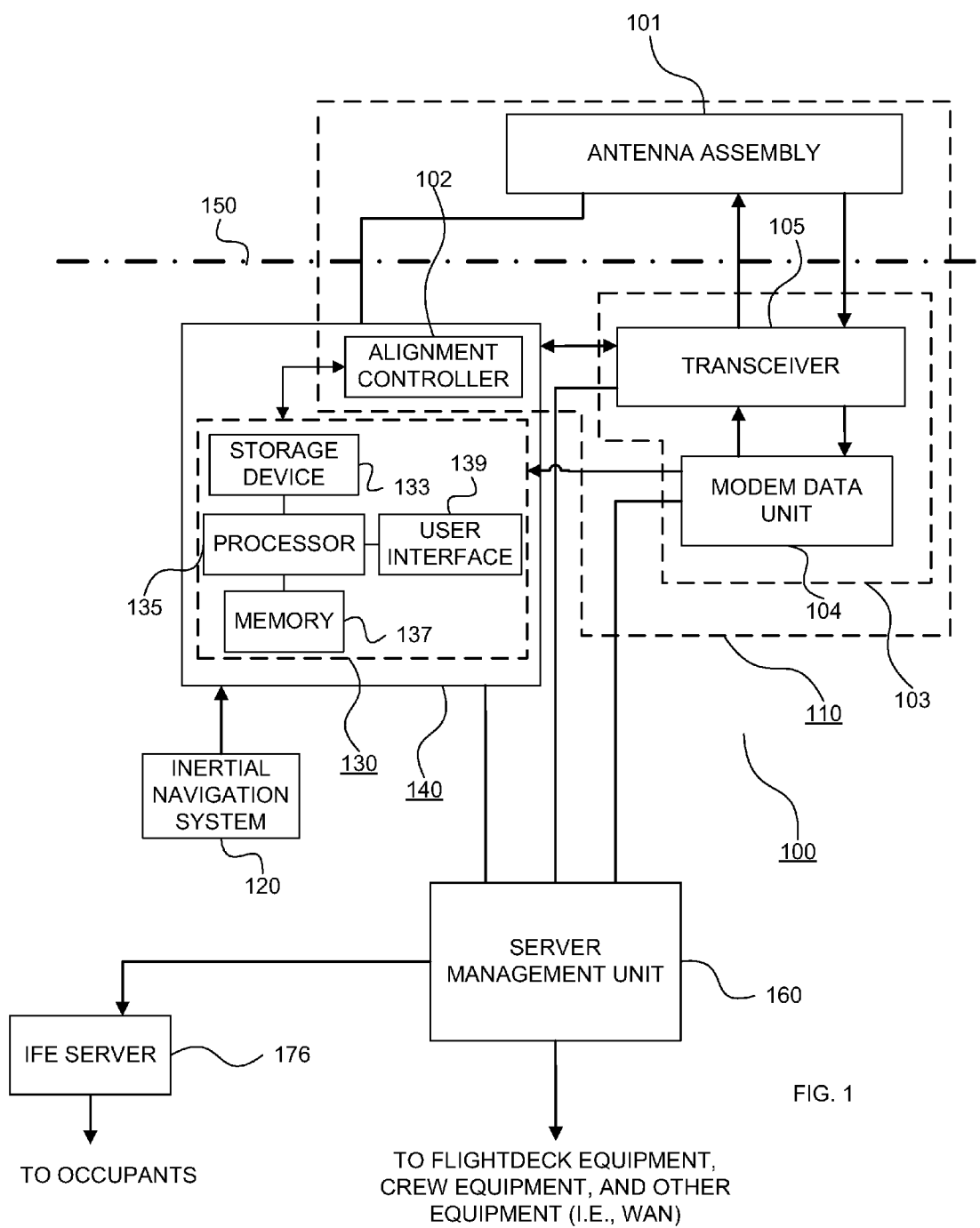
FIG. 1 is a schematic diagram of a system environment according to an embodiment of the disclosure.

FIG. 1. is a schematic diagram of a system 100 according to an exemplary embodiment of the present disclosure. An exemplary embodiment of system 100 can be configured to control and adjust the alignment of an antenna subsystem 110 configured to communicate with a communication source, such as, for example, an earth-orbiting satellite, for instance, a geostationary satellite. Antenna subsystem 110 may be affixed to any suitable stationary, mobile, or portable vehicle. In an exemplary embodiment, antenna subsystem 110 may be affixed on a vehicle such as, for example, an automobile, bus, airplane, sea vessel, train, or other mode of conveyance. According to one embodiment, antenna subsystem 110 may be located aboard a commercial airplane and configured to support high-speed wireless voice, video, radio, and/or data communication for a plurality of occupants located therein. Antenna subsystem 110 may include antenna assembly 101. In one embodiment, antenna assembly 101 may include an antenna array that includes a plurality of array elements, such as, for example, antenna horns. The plurality of array elements may be arranged in any pattern and using any predetermined spacing between elements. Antenna assembly 101 is configured to detect, receive, collect, or otherwise sense electromagnetic energy that is incident upon array elements as well as to transmit to a remote antenna assembly—as may be located on a satellite. In an embodiment consistent with the disclosure, antenna assembly 101 may be a Satellite Broadband Antenna Assembly ("SBAA"). For example, antenna assembly 101 may receive radio frequency (RF) signals transmitted by a remote source located at elevation θ and azimuth φ, such as a satellite. As used herein, the alignment offset is the angular difference between the orbital location of the remote source (as defined by elevation and azimuth) and the axis of the main lobe of antenna assembly 101. Additionally, antenna assembly 101 may also receive other RF signals from undesirable sources, including, for example, signals from other communication systems or energy generated by noise sources. Thus, to track signals received from an intended remote source while antenna subsystem 110 is moving, the RF signals received by antenna assembly 101 may be further analyzed and processed.

In an exemplary embodiment, antenna assembly 101 is coupled with alignment controller 102 for controlling the alignment of antenna assembly 101 relative to the remote source. In an embodiment consistent with the disclosure, alignment controller 102 may form a part of Antenna Control Unit 140 ("ACU 140"). Alignment controller 102 and/or ACU 140 may receive information from Inertial Navigation System 120 ("INS 120") in order to control and/or maintain the alignment of antenna assembly 101 so as to optimize the ability of the system to receive signals from the desired remote source and to suppress or minimize the effect of other undesired signals. Also, antenna assembly 101 may be coupled to receiver 103, which may process the signals received by antenna assembly 101 for further processing and/or use, as by processing system 130. Receiver 103 may be configured to provide general signal processing operations on the received signals. Consistent with an embodiment of the disclosure, receiver 103 may include MODEM data unit 104 ("MDU 104") and Transceiver 105.

In an exemplary embodiment of system 100, antenna subsystem 110 is configured to communicate with processing system 130. Processing system 130 may embody any suitable microprocessor-based system capable of being programmed to monitor, record, analyze, process, and/or manipulate information that it acquires from antenna subsystem 110. Without limitation, processing system 130 may embody a conventional personal computer or workstation. Processing system 130 may include one or more hardware and/or software components configured to execute computer-executable instructions and/or software programs. Processing system 130 may include one or more hardware components such as, for example, processor 135, memory 137 (random access memory (RAM), read-only memory (ROM)), storage device 133, interface 139, and one or more input/output (I/O) device. Alternatively and/or additionally, processing system 130 may include one or more software components such as, for example, a computer-readable medium including computer-executable instructions for performing methods consistent with certain disclosed embodiments. In an embodiment consistent with the disclosure, processing system 130 acquires signal values from MDU 104.

As indicated in FIG. 1 in an exemplary embodiment of system 100, processing system 130 is also communicable with INS 120. INS 120 is associated with the vehicle and is configured to detect, for example, changes in the vehicle's geographic position, velocity (speed and direction of movement), and orientation (rotation about an axis, i.e., yaw, roll, and pitch). When the vehicle is in movement, antenna subsystem 110 may use information provided by INS 120 to align antenna assembly 101 relative to the remote communications source. Particular embodiments of the disclosure are directed to correcting errors in alignment of antenna assembly 101. Such alignment errors may be due to, for example, the location of INS 120 relative to antenna assembly 101 and/or misalignments between INS 120 and the vehicle. Further still, and even in the absence of the above sources of error, INS 120 may inherently suffer from drift errors, which may affect any determination of antenna assembly 101 alignment that is relied upon by antenna subsystem 110.

According to one embodiment, measurements of RF signals received by antenna assembly 101 are acquired while the vehicle is stationary and in motion. As will be explained in more detail below, these measurements may be taken to perform calculations that may be used to determining whether the antenna is optimally aligned relative to the remote source. In an embodiment consistent with the disclosure, where antenna subsystem 110 is affixed to a commercial plane, line 150 may depict the fuselage of the plane.

Additional equipment that may be connected to system 100 includes server management unit 160, which is in communication with transceiver 105, MDU 104, and ACU 140. Server management unit 160 may, for example, acquire and provide the data that is being received from and transmitted by antenna assembly 101. Server management unit 160 may have additional connections to flight deck equipment, crew equipment, and other equipment, such as a wireless-area-network server (WAN). Server management unit 160 may also have a connection to in-flight-entertainment server 176 ("IFE 176").

Figure 5:
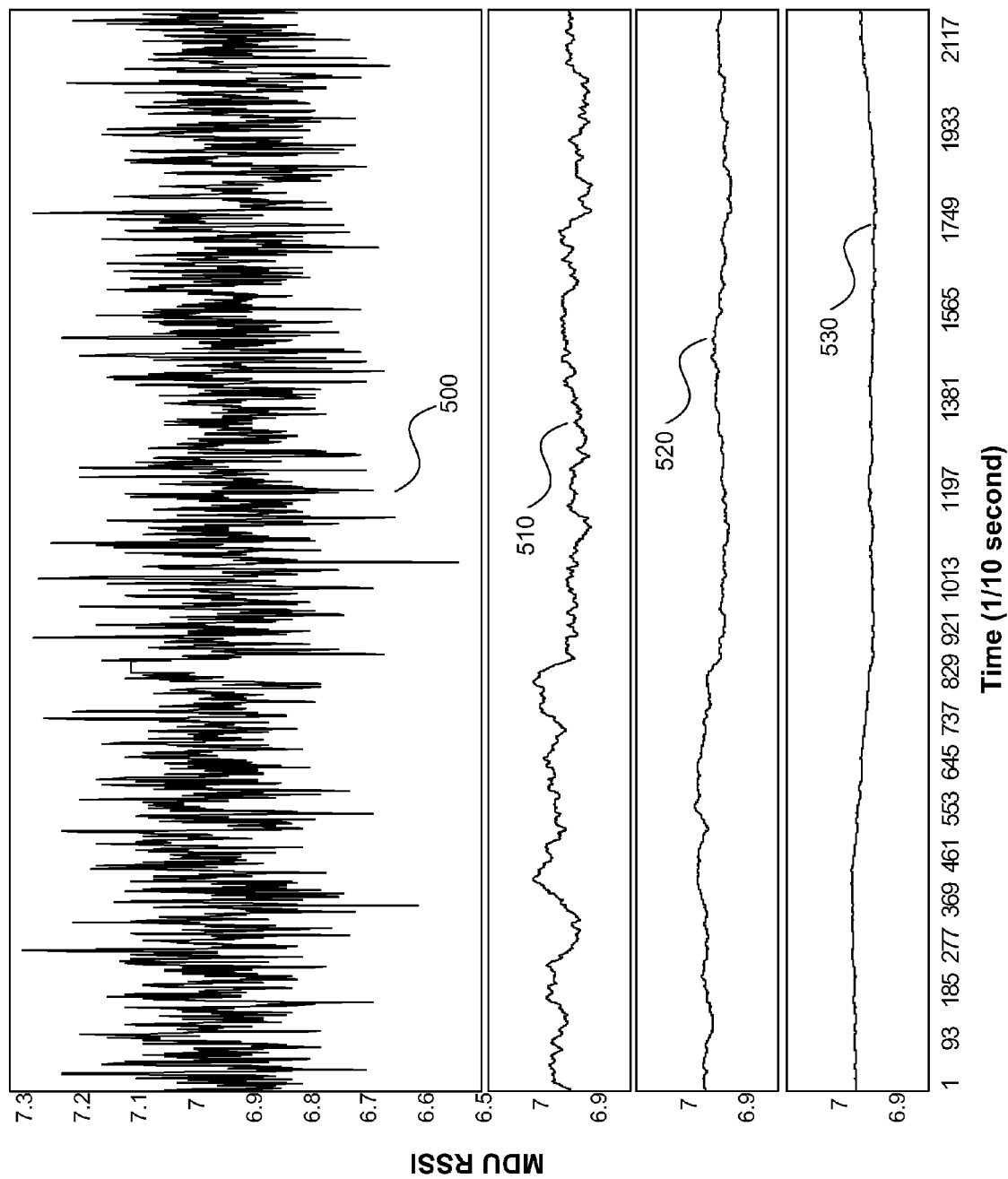
FIG. 5 depicts a plot of acquired signal strength values compared with computed averages as a function of time intervals of different durations.
Figure 6:
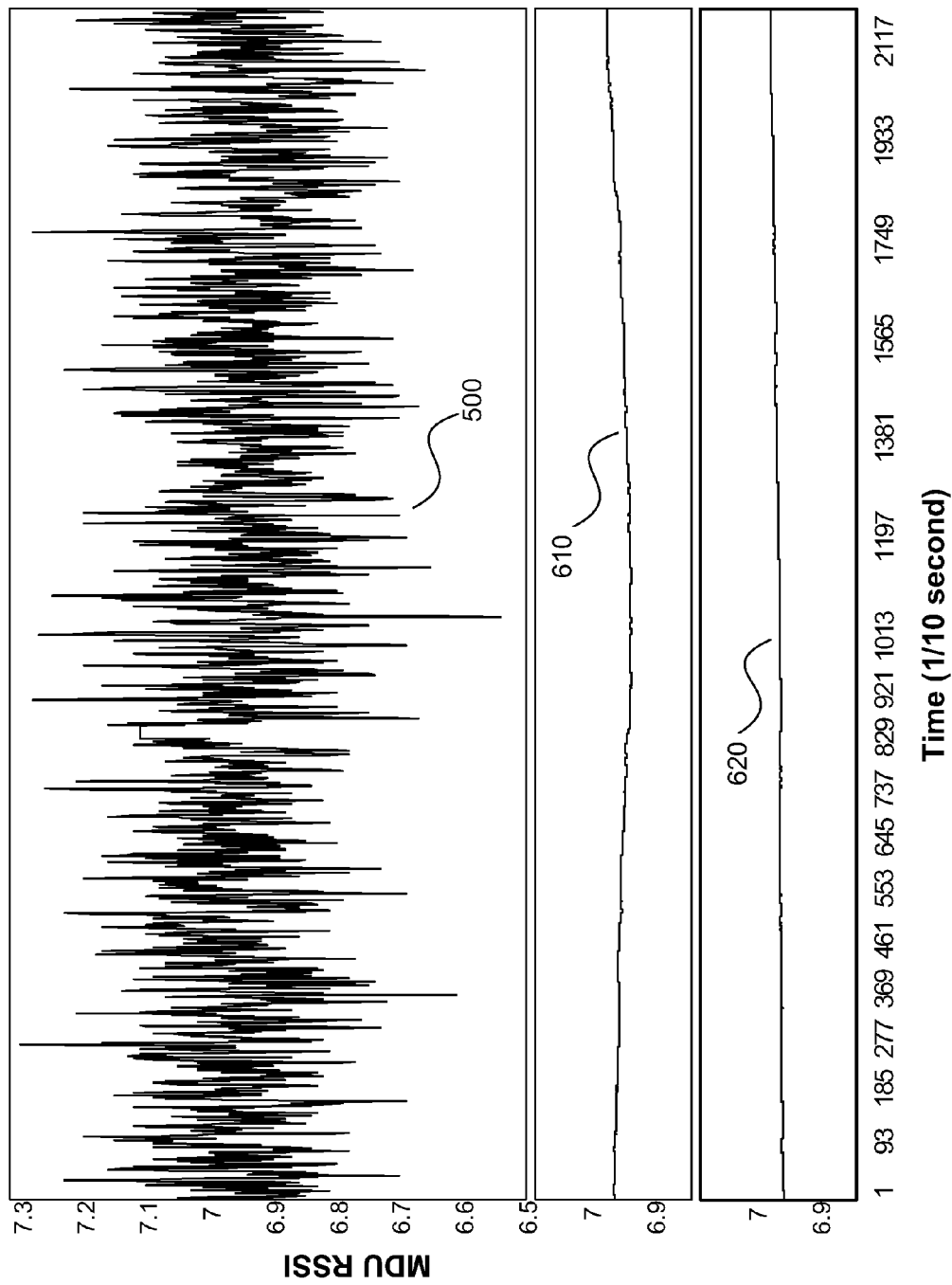
FIG. 6 depicts an additional plot of acquired signal strength values compared with computed averages as a function of time intervals of different durations.

Considering system 100 again, FIGS. 5-6 depict plots of measured and coarse-grained signal strength values that may be acquired by the embodiment of FIG. 1, where antenna assembly 101 receives RF signals from a remotes source. In an exemplary embodiment, the signal strength values are the received signal strength indications (RSSI), which are measurements of the power present in a received radio signal. Both the measured RSSI values and the coarse-grained RSSI values (which are derived from the measured RSSI values) are depicted in FIGS. 5 and 6 as a function of time. As will be described in more detail below, the particular coarse-grained RSSI values depicted in FIGS. 5 and 6 were computed as arithmetic averages of RSSI values measured over time windows of particular durations. Without limitation, however, a method or system capable of generating a coarse-grained value from a set of signal strength values may embody any arithmetic technique capable of suppressing the effect of high-frequency oscillations in the set of signal-strength values that may be present as a function of time (i.e., capable of "smoothing" a plot of the data set as a function of time). Without limitation, a coarse-grained value may be derived from an averaging technique (i.e., without limitation, an arithmetic average, a geometric average, a statistical median value, weighted averages, sliding averages, and/or a statistical mean value). Further, a coarse-grained value may be derived through a least-squares analysis, and/or may be derived through an analysis of derivatives of the values. Further still, and without limitation, a coarse-grained value may be derived through Fourier analysis, such as through a suppression of high-frequency signal values.

In FIGS. 5 and 6, data 500 are measured RSSI values that are sampled at 10 Hz (i.e., a new RSSI value is determined every tenth of a second). In the embodiment depicted in FIG. 1, processing system 130 acquires RSSI values from MDU 104. The abscissa in FIGS. 5 and 6 corresponds to the number of time increments (in units of one-tenth of a second) over which the RSSI values are sampled. As illustrated in FIGS. 5 and 6, the plot of data 500 as a function of time is relatively irregular, and the values vary from approximately 6.55 to 7.3.

In contrast to irregular aspect of data 500 as a function of time, FIG. 5 also depicts data 510, which is a plot of coarse-grained values of the set of RSSI values depicted in data 500. In an embodiment consistent with the disclosure, and in the data set depicted in FIG. 5, data 510 is an arithmetic average of RSSI values taken over a moving window that is 10 seconds in duration. The plot of data 510—in contrast to that of data 500—varies from a minimum of approximately 6.9 to a maximum of approximately 7.0. Thus, it is seen that the irregular structure in the distribution of RSSI values as a function of time becomes "smoothed" over as the time duration over which the average RSSI value is computed is made longer.

This is further illustrated with data 520 and data 530, also depicted in FIG. 5. Data 520 and data 530 (which are both a set of coarse-grained values of the set of RSSI values depicted in data 500) are both arithmetic averages of RSSI values taken over a moving window that is, respectively, 30 seconds and 60 seconds in duration. Further still, FIG. 6 depicts data 610 and data 620 (displayed relative to data 500 which is described above), where 610 and data 620 (which, again, are both a set of coarse-grained values of the set of RSSI values depicted in data 500) are both arithmetic averages of RSSI values taken over a moving window that is, respectively, 120 seconds and 300 seconds in duration. In the above exemplary embodiment, the time windows are overlapping. In other exemplary embodiment, certain of the data sets may include time windows that are adjacent to one another and non-overlapping.

As may be seen in connection with FIGS. 7 and 8, discussed further below, the "smoothed" value towards which a coarse-grained signal strength value tends to (as, for example, has been illustrated in FIGS. 5 and 6 using arithmetic averages over larger and larger increasing time windows) may be correlated to the alignment offset the receiving antenna exhibits relative to the remote source.

Figure 7:
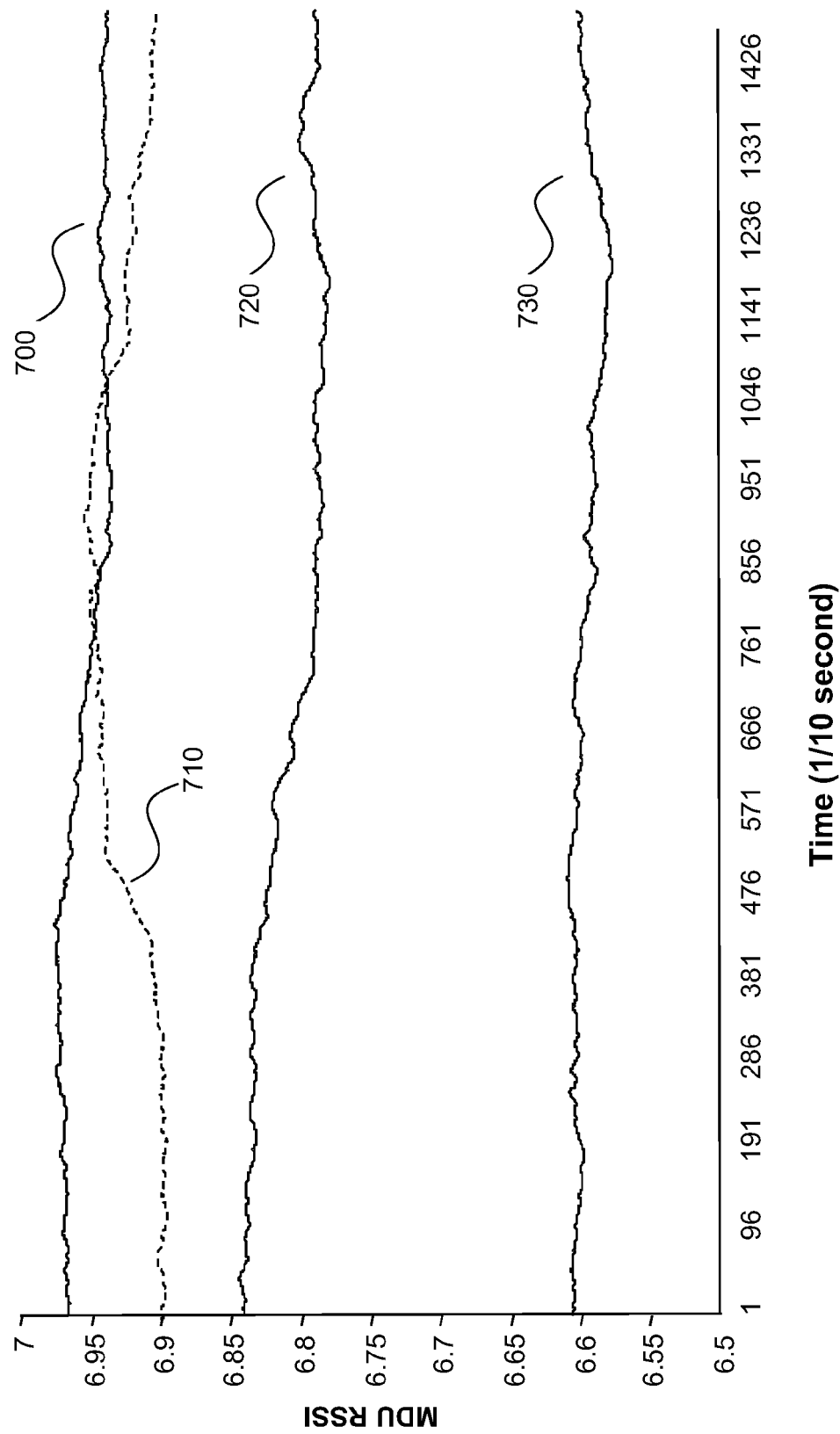
FIG. 7 depicts a plot of averaged signal strength values as a function of time and associated with different alignment offset values.

FIG. 7 depicts four sets of data as a function of time: data 700, data 710, data 720 and data 730. As with FIGS. 5 and 6, the abscissa in FIG. 7 corresponds to the number of time increments (in units of one-tenth of a second) over which the RSSI values are sampled. Moreover, each of the four sets of data plotted in FIG. 7, (that is, data 700, data 710, data 720 and data 730) are plots of the arithmetic average of measured RSSI values taken over a moving window of 60 seconds in duration. Each of the data sets, however, is associated with RSSI values measured by an antenna assembly 101 at a different alignment offset relative to the remote source. That is, data 700 is a plot of the arithmetic average of measured RSSI values taken over a moving window 60 seconds in duration by an antenna assembly that exhibited a 0 degree alignment offset with the remote source. (That is, the axis of the main lobe of antenna assembly 101 may be considered perfectly aligned with the remote source, which may be a target satellite.) Data 710 is a plot of the arithmetic average of measured RSSI values taken over a moving window 60 seconds in duration by an antenna assembly that exhibited a 0.2 degree alignment offset with the remote source. Data 720 is a plot of the arithmetic average of measured RSSI values taken over a moving window 60 seconds in duration by an antenna assembly that exhibited a 0.4 degree alignment offset with the remote source. Further still, data 730 is a plot of the arithmetic average of measured RSSI values taken over a moving window 60 seconds in duration by an antenna assembly that exhibited a 0.6 degree alignment offset with the remote source.

As is depicted in FIG. 7, data 720 and data 730 correspond to relatively well-separated curves and do not intersect. That is, the plots of data 720 and data 730 do not cross one another over time. This delineation aids the during movement determination of the antenna alignment based on the strengths of signals received from the signal source. For example, if the strength of the received-in-movement signal measures approximately 6.6, it may be determined by referring to data 730 that the pointing error, or misalignment, of the antenna is approximately 0.6 degrees. Similarly, if the strength of the received-in-movement signal measures between approximately 6.8 and approximately 6.85, it may be determined by referring to data 720 that the pointing error of the antenna is approximately 0.4 degrees.

In contrast, data 700 and data 710 reflect curves that are much closer to one another. Indeed, as depicted in FIG. 7, data 700 and data 710 cross at least twice over a two minute interval. The proximity of data 700 and data 710 may render it difficult to determine the alignment of antenna assembly 101 relative to the remote source. For example, if the strength of the received-in-movement signal measures approximately 6.9, it may be determined that the pointing error is within a range of values. As such, it might not be possible to determine whether an adjustment to the alignment of the antenna is desirable and/or necessary. For example, if the strength of the received-in-movement signal measures at approximately 6.9, it may be determined with reference to data 700 that the pointing error, or misalignment, of the antenna is approximately 0.0 degrees. If this determination is correct, then further adjustments to the alignment of the antenna may not be necessary. In contrast, it may also be determined with reference to data 710 that a received-in-movement signal at approximately 6.9 is associated with a pointing error, or misalignment, of the antenna of approximately 0.2 degrees. If this latter determination is correct, then further adjustments to the pointing of the antenna may be necessary. Consequently, because the curves associated with data 700 and data 710 as a function of time are close to each other, it may not be possible to use received signal strength to determine whether the pointing error is 0.0 degrees or 0.2 degrees.

However, as explained earlier with reference to FIGS. 5 and 6, the amplitudes of the plotted values are increasingly "smoothed out" as the window of time over which measured values are averaged is increased. According to one embodiment, the time windows over which measurements of RF signals received by antenna assembly 101 are taken while the antenna subsystem 110 is stationary, have durations of over 60 seconds. As will be explained in more detail below, such calculations will facilitate more definite determinations of antenna alignment during antenna movement, such as, for example, during in-flight situations.

Figure 8:
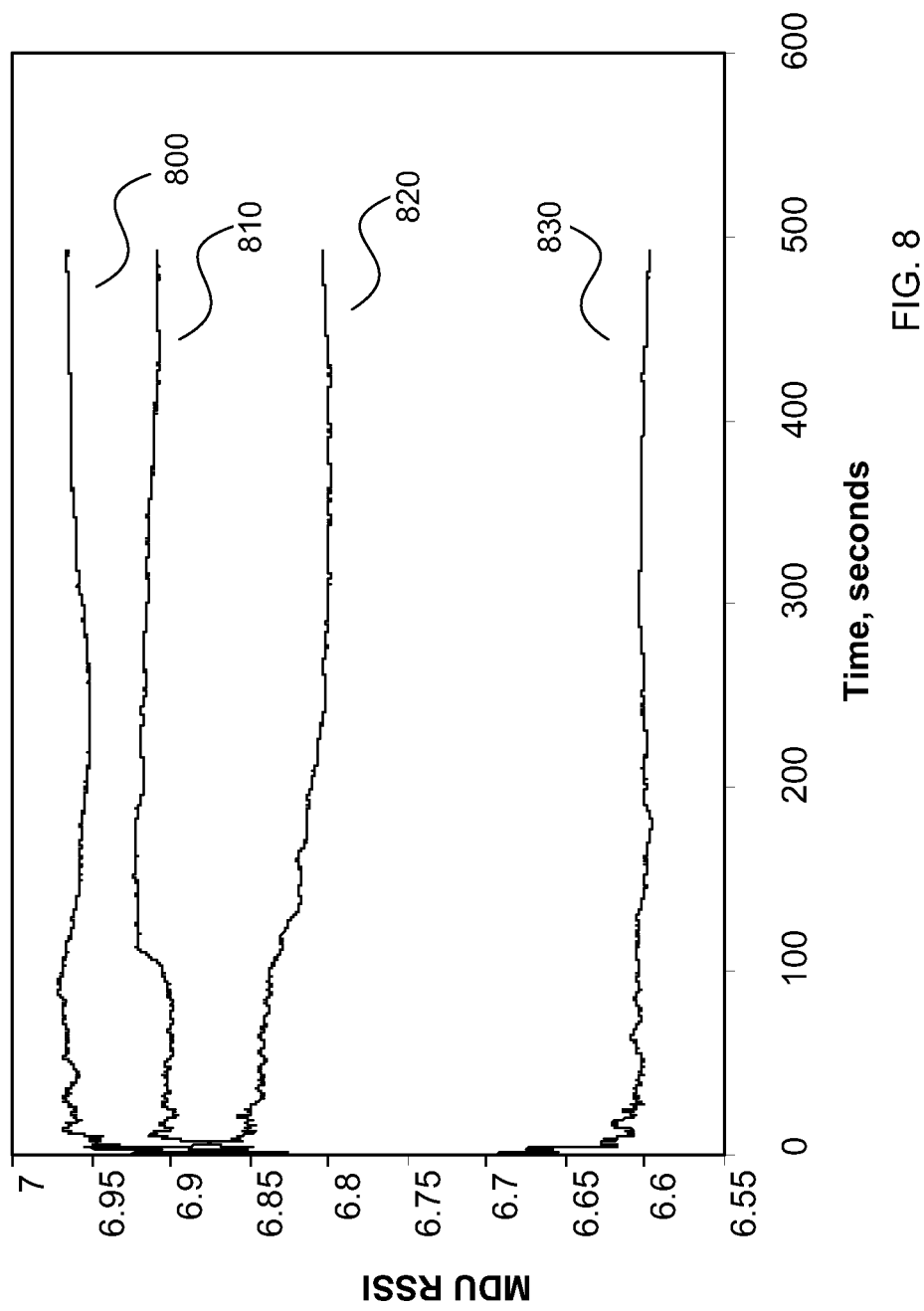
FIG. 8 depicts a plot of averaged signal strength values, as computed using a cumulative average, and associated with different alignment offset values.

FIG. 8 depicts a plot of RSSI values computed as cumulative averages over the entire time duration that is indicated on the abscissa. As with FIG. 7, each of the data sets depicted in FIG. 8 is associated with RSSI values measured by an antenna assembly 101 at a different alignment offset relative to the remote source. In particular, data set 800 is associated with RSSI values measured with an alignment offset of 0.0 degrees (i.e., the measurements are taken by the antenna assembly while "on axis"). Data set 810 is associated with RSSI values measured with an alignment offset of 0.2 degrees. Data set 820 is associated with RSSI values measured with an alignment offset of 0.4 degrees. Moreover, data set 830 is associated with RSSI values measured with an alignment offset of 0.6 degrees. The plot of data in FIG. 8 also illustrates the "smoothing" effect that was discussed above in connection with FIGS. 5 and 6. That is, close to 0 seconds (such as at 0.1 seconds, 0.2 seconds, etc.) the cumulative average corresponds to a time window of 0.1 seconds, 0.2 seconds, etc., and each of the data sets exhibits the variation in amplitude that is reflected in data 500. The further out from 0 seconds that the cumulative average is computed, the more each data set takes on the attribute of data 510 (10 seconds), data 520 (30 seconds), data 530 (60 seconds), data 610 (120 seconds) and data 620 (300 seconds).

Consequently, the likelihood that each of the measured data sets corresponding to alignment offsets of 0.0 degrees, 0.2 degrees, 0.4 degrees, and 0.6 degrees will be separated enough to discriminate between values to a suitable precision increases as the duration of the time window over which measured RF values are averaged is increased. That is, as the duration of the time window is increased and, therefore, an increasing number of samples are used to compute a coarse-grained value (for example, such as an arithmetic average), an increased level of precision may be provided. In connection with an exemplary embodiment of an antenna assembly affixed to a commercial plane, this corresponds to an increased level of certainty for determinations that are made in-flight.

For example, a suitable separation between the data sets corresponding to alignment offsets of 0.0 degrees, 0.2 degrees, 0.4 degrees, and 0.6 degrees may be obtained when coarse-grained values are computed as arithmetic averages using time windows of over 60 seconds in duration. According to one exemplary embodiment, such coarse-grained values may be derived from arithmetic averages using time windows of 100 seconds, 200 seconds, 300 seconds, 400 seconds, or 500 seconds in duration. Because the signal characteristics at such durations are more suitably delineated, the likelihood that a coarse-grained value of received signal strength will correspond with only one characteristic is increased. As such, this increases the usefulness of the computations in determining the alignment of the antenna while, for example, an aircraft is in flight.

In addition to tracking a remote source in order to optimize any received signal, a determination of antenna alignment helps to ensure that transmissions from the antenna to a remote receiver (such as a remote satellite) will be within known ranges of adjustment while the vehicle the antenna is affixed to is in movement. For example, as explained earlier, FCC regulations provide that a pointing error of less than 0.2 degrees must be maintained between the orbital location of the target communication source and the axis of the main lobe of the antenna.

Further still, FCC regulations state that "all emissions from the ESV shall automatically cease within 100 milliseconds if the angle between the orbital location of the target satellite and the axis of the main lobe of the ESV antenna exceeds 0.5°, and transmission will not resume until such angle is less than 0.2°." 47 C.F.R. 25.221(a)(1)(iii)(A).

In one embodiment consistent with the disclosure, a cumulative arithmetic average RSSI value may be monitored by processing system 130 and a determination may be made that antenna assembly 101 has an alignment offset of ±0.2 degrees (as, for example, where processing system 130 computes a cumulative arithmetic average RSSI value that approaches the long-term value reflected in data 810 depicted in FIG. 8). While the determination that the offset is 0.2 degrees may be precisely arrived at, the measured data does not necessarily reflect in which direction the 0.2 degrees offset is. That is, data 810 in FIG. 9 is the same whether the 0.2 degree offset is to the north, south, east or west of perfect alignment. Consequently, in order to correct the alignment of antenna assembly 101, system 100 needs additional information.

Consistent with this disclosure, that information may be acquired by issuing provisional adjustment instructions to antenna assembly 101 and acquiring—over a shorter time frame—additional coarse-grained signal strength values that should reflect whether the antenna has moved toward or away from 0.0 degrees alignment offset.

For example, upon determining that antenna assembly 101 has an alignment offset of ±0.2 degrees, processing system 130 may be configured to issue instructions to alignment controller 102 to provisionally adjust antenna assembly 0.2 degrees north from its current alignment. This provisional adjustment may have caused antenna assembly 101 to exhibit an alignment offset of 0.0 degrees or 0.4 degrees. In either case, however, antenna assembly is still below the 0.5 degree offset that is associated with FCC regulations.

Following the 0.2 degree provisional adjustment north, processing system 130 may be configured to acquire a new set of signal strength values. Unlike the existing cumulative average of RSSI values (which, for example, provided the indication that the offset was 0.2 degrees), a new cumulative average based upon this newly initiated set of received values will initially exhibit the large amplitude variations such as those as depicted in data 500 of FIGS. 5 and 6. After approximately 60 seconds, however, the new cumulative average will have smoothed out to provide an initial indication of whether the provisional adjustment instructions where in the correct direction (i.e., tending towards 0.0 degrees offset), or in the wrong direction (i.e., tending towards 0.4 degrees offset).

With reference to FIG. 8, the separation between data 800 (which is associated with 0.0 degrees offset) and data 820 (which is associated with 0.4 degrees offset) is sufficiently defined so as to provide the additional information to processing system 130 necessary to either maintain the provisional adjustment, or issue new instructions to alignment controller 102 to reverse the provisional adjustment and to make a 0.2 degree adjustment in the opposite direction.

That is, should processing system 130 have determined that the provisional adjustment 0.2 degrees north yields cumulative arithmetic average RSSI values tending toward data 820 from FIG. 8, processing system 130 may be configured to issue new instructions to alignment controller 102 to make a provisional adjustment 0.4 degrees south. Again, following the 0.4 degree provisional adjustment south, processing system 130 may be configured to acquire a new set of signal strength values in order to monitor the effect of the provisional adjustment and to further fine tune the alignment of antenna assembly 101.

Figure 2:
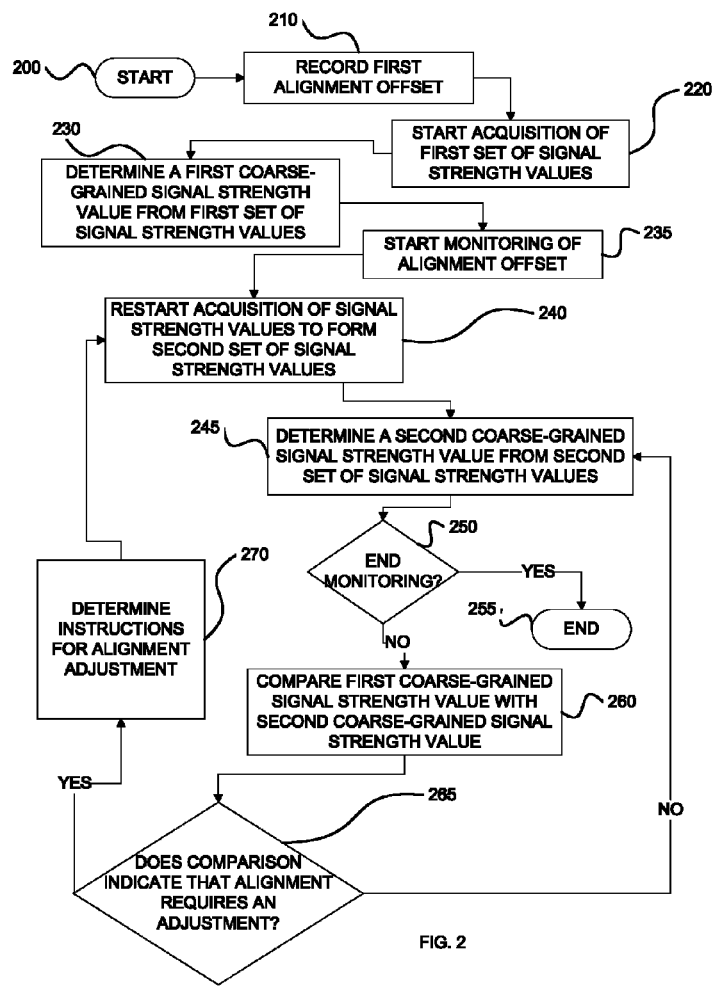
FIG. 2 is a flow chart of an exemplary process of monitoring and controlling alignment, consistent with the present disclosure.

FIG. 2 depicts a flow chart of an exemplary process of monitoring and/or controlling antenna alignment, consistent with the embodiment depicted in FIG. 1. Note that although certain of the steps in FIG. 2 (and in FIGS. 3 and 4) may be depicted herein as being carried out in a particular order, it will be appreciated that the depicted order is in no way limiting of the disclosure or the appended claims. For example, step 210 in FIG. 2 relates to recording the known alignment of antenna assembly 101 with a remote source. Although step 210 is depicted as occurring prior to step 220, which relates to acquiring a first set of signal strength values from the remote source, one would appreciate—consistent with the disclosure—that step 210 does not necessarily have to occur prior to step 220.

In connection with the first set of signal strength values that are acquired in step 220, step 230 relates to determining at least a first coarse-grained signal strength value from the first set of signal strength values. In a preferred embodiment, steps 210, 220, and 230 occur while antenna assembly 101 is stationary. For example, where antenna subsystem 110 is affixed to a commercial airliner, for example, steps 210, 220 and 230 may be performed when the airliner is at a known geographic location, with a known alignment relative to a remote source of radiofrequency radiation—such as a geostationary satellite.

Step 235 relates to the initiation of alignment offset monitoring. For example, in a preferred embodiment where antenna subsystem 110 is affixed to a commercial airliner, for example, steps 240, 245, 260, 265, and 270 may be performed when the airliner is in transit.

Step 240 relates to the acquisition of a second set of signal strength values. The second set of signal strength values may be acquired and stored in any way suitable for the processing recited in step 245, where a second coarse-grained signal strength value is determined from the second set of signal strength values acquired in step 240.

Step 250, which is part of the loop of steps 240, 245, 260, 265, and 270, simply relates to a decision to cease monitoring. For example, such a decision may be useful for a variety of external reasons—such as after a commercial airliner is no longer in transit.

Step 260 relates to a comparison between the second coarse-grained value derived in step 245 with the first coarse-grained value derived in step 230. In an exemplary embodiment, such a second coarse-grained value may be a cumulative arithmetic average acquired while a commercial plane is in flight as compared against the set of data depicted in FIG. 8.

Step 265 relates to a decision as to whether the comparison indicates that antenna assembly 101 requires an adjustment. As may be determined from the data depicted in FIG. 8, in an exemplary embodiment, such a determination may have a time-dependent feature to it. For example, as has been discussed in connection with FIG. 7, a cumulative arithmetic average RSSI value associated with an overall time period of 60 seconds or less may not reflect the precision necessary to determine whether the alignment offset of 0.0 degrees or 0.2 degrees.

At later cumulative time periods, however, such as 100 seconds, 200 seconds, 300 seconds, 400 seconds, or 500 seconds, a cumulative arithmetic average RSSI value provides the precision necessary to distinguish between 0.0 degrees offset and 0.2 degrees offset.

Following a "NO" determination in step 265, and consistent with the disclosure, processing system 130 may return to step 245 and determine a further coarse-grained signal strength value from the set of values that are being acquired in step 240.

Following a "YES" determination in step 265, and consistent with the disclosure, processing system 130 may determine instructions to issue to alignment controller 102. Where such instructions are acted upon, processing system 130 may be configured to initiate a new set of signal strength values to use as the "second set of signal strength values" (i.e., processing system 130 may be configured to "restart" the acquisition of signal strength values for the second set of signal strength values to be used in the loop of steps 240, 245, 260, 265, and 270).

Figure 3:
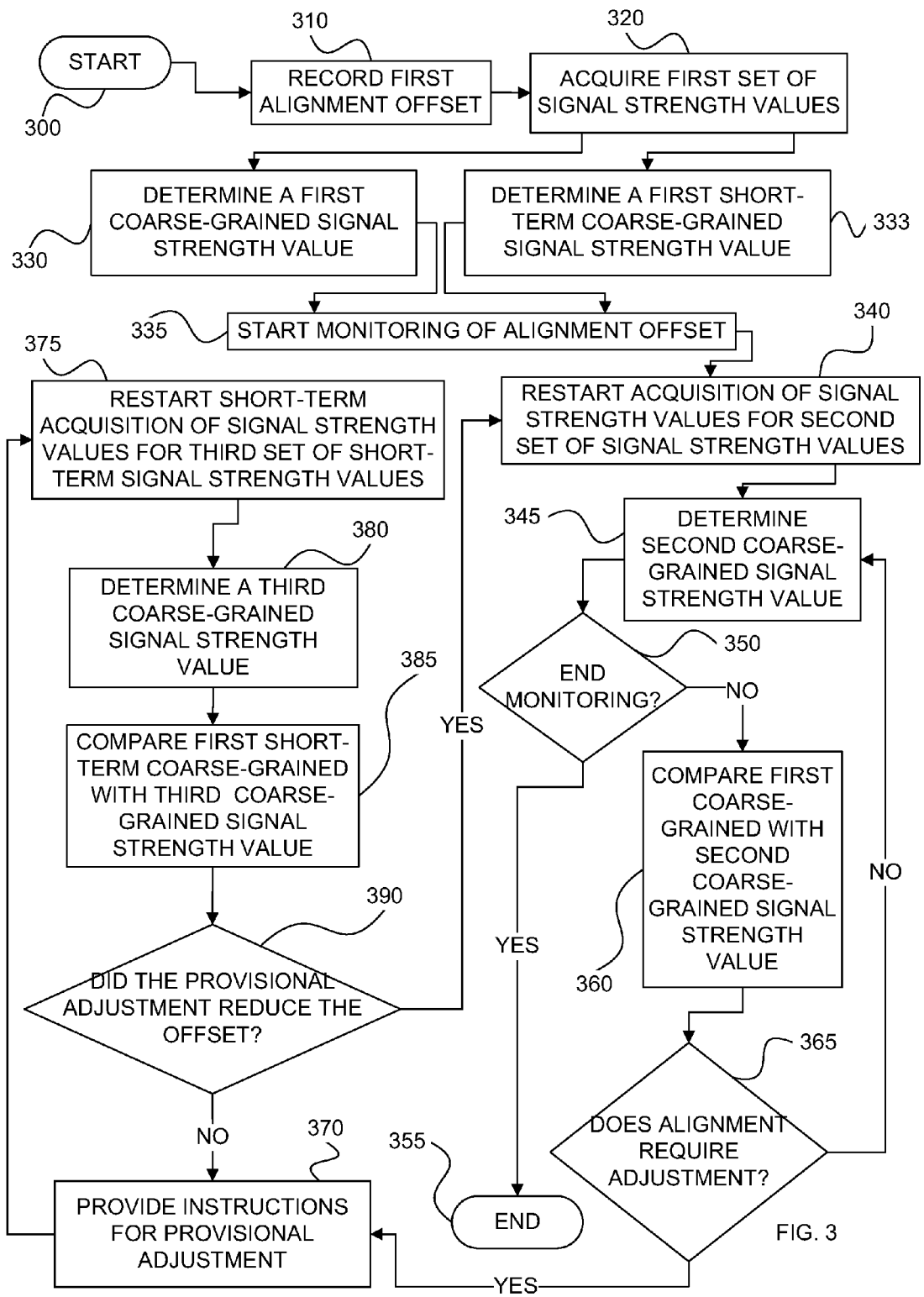
FIG. 3 is another flow chart of an exemplary process of monitoring, testing, and controlling alignment, consistent with the present disclosure.

FIG. 3 depicts a further flow chart of an exemplary process of monitoring and/or controlling antenna alignment, consistent with the embodiment depicted in FIG. 1. As was discussed in connection with FIG. 2, step 310 in FIG. 3 relates to recording the known alignment of antenna assembly 101 with a remote source. Again, although step 310 is depicted as occurring prior to step 320, which relates to acquiring a first set of signal strength values from the remote source, one would appreciate—consistent with the disclosure—that step 310 does not necessarily have to occur prior to step 320.

In connection with the first set of signal strength values that are acquired in step 320, step 330 relates to determining at least a first coarse-grained signal strength value from the first set of signal strength values. Furthermore, and consistent with an exemplary embodiment of the disclosure, step 333 relates to determining at least a first short-term coarse-grained signal strength value from the first set of signal strength values. Note that where the coarse-grained signal strength value is a cumulative arithmetic average, a single collection of data (such as data 800, data 810, data 820, and data 830 of FIG. 8) may include both short-term and "long-term" coarse-grained values. In a preferred embodiment, steps 310, 320, 330, and 333 occur while antenna assembly 101 is stationary. For example, where antenna subsystem 110 is affixed to a commercial airliner, steps 310, 320, 330, and 333 may be performed when the airliner is at a known geographic location, with a known alignment relative to a remote source of radiofrequency radiation—such as a geostationary satellite.

Step 335 relates to the initiation of alignment offset monitoring. For example, in a preferred embodiment where antenna subsystem 110 is affixed to a commercial airliner, steps 340, 345, 360, 365, 370, 375, 380, 385, and 390 may be performed when the airliner is in transit.

Step 340 relates to the acquisition of a second set of signal strength values. The second set of signal strength values may be acquired and stored in any way suitable for the processing recited in step 345, where a second coarse-grained signal strength value is determined from the second set of signal strength values acquired in step 340.

Step 350, which is part of the loop of steps 340, 345, 360, 365, 370, 375, 380, 385, and 390, simply relates to a decision to cease monitoring. For example, such a decision may be useful for a variety of external reasons—such as after a commercial airliner is no longer in transit.

Step 360 relates to a comparison between the second coarse-grained value derived in step 345 with the first coarse-grained value derived in step 330. In an exemplary embodiment, such a second coarse-grained value may be a cumulative arithmetic average acquired while a commercial plane is in flight as compared against the set of data depicted in FIG. 8.

Step 365 relates to a decision as to whether the comparison indicates that antenna assembly 101 requires an adjustment. As may be determined from the data depicted in FIG. 8, in an exemplary embodiment, such a determination may have a time-dependent feature to it. For example, as has been discussed in connection with FIG. 7, a cumulative arithmetic average RSSI value associated with an overall time period of 60 seconds or less may not reflect the precision necessary to determine whether the alignment offset of 0.0 degrees or 0.2 degrees.

At later cumulative time periods, however, such as 100 seconds, 200 seconds, 300 seconds, 400 seconds, or 500 seconds, a cumulative arithmetic average RSSI value provides the precision necessary to distinguish between 0.0 degrees offset and 0.2 degrees offset.

Following a "NO" determination in step 365, and consistent with the disclosure, processing system 130 may return to step 345 and determine a further coarse-grained signal strength value from the set of values that are being acquired in step 340.

Following a "YES" determination in step 365, and consistent with the disclosure, processing system 130 may determine instructions for a provisional adjustment to issue to alignment controller 102.

Step 375 relates to the acquisition of a third set of signal strength values. In an exemplary embodiment, these are the values for the so-called "short-term" coarse-grained valued. The third set of signal strength values may be acquired and stored in any way suitable for the processing recited in step 380, where a third coarse-grained signal strength value is determined from the third set of signal strength values acquired in step 375.

Step 385 relates to a comparison between the third coarse-grained value derived in step 380 with the first short-term coarse-grained value derived in step 333. In an exemplary embodiment, such a third coarse-grained value may be a cumulative arithmetic average acquired while a commercial plane is in flight following a provisional adjustment as compared against the set of data depicted in FIG. 8.

Step 390 relates to a decision as to whether the provisional adjustment of antenna assembly 101 was in the correct direction (i.e., in a direction that reduced the alignment offset). Again, as may be determined from the data depicted in FIG. 8, in an exemplary embodiment, such a determination may have a time-dependent feature to it. For example, as has been discussed in connection with FIG. 7, a cumulative arithmetic average RSSI value associated with an overall time period of 60 seconds or less may not reflect the precision necessary to determine whether the alignment offset of 0.0 degrees or 0.2 degrees.

At later cumulative time periods, however, such as 100 seconds, 200 seconds, 300 seconds, 400 seconds, or 500 seconds, a cumulative arithmetic average RSSI value provides the precision necessary to distinguish between 0.0 degrees offset and 0.2 degrees offset.

Following a "NO" determination in step 390, and consistent with the disclosure, processing system 130 may determine additional instructions for a further provisional adjustment to issue to alignment controller 102. Where such instructions are acted upon by alignment controller 102, processing system 130 may be configured to initiate a new set of short-term signal strength values to use as the "third set of signal strength values" (i.e., processing system 130 may be configured to "restart" the acquisition of short-term signal strength values for the third set of signal strength values to be used in the loop of steps 380, 385, and 390).

Following a "YES" determination in step 390, and consistent with the disclosure, processing system 130 may return to step 340. Again, processing system 130 may be configured to initiate a new set of signal strength values to use as the "second set of signal strength values" (i.e., processing system 130 may be configured to "restart" the acquisition of signal strength values for the second set of signal strength values to be used in the loop of steps 340, 345, 360, 365, 370, 375, 380, 385, and 390).

Figure 4:
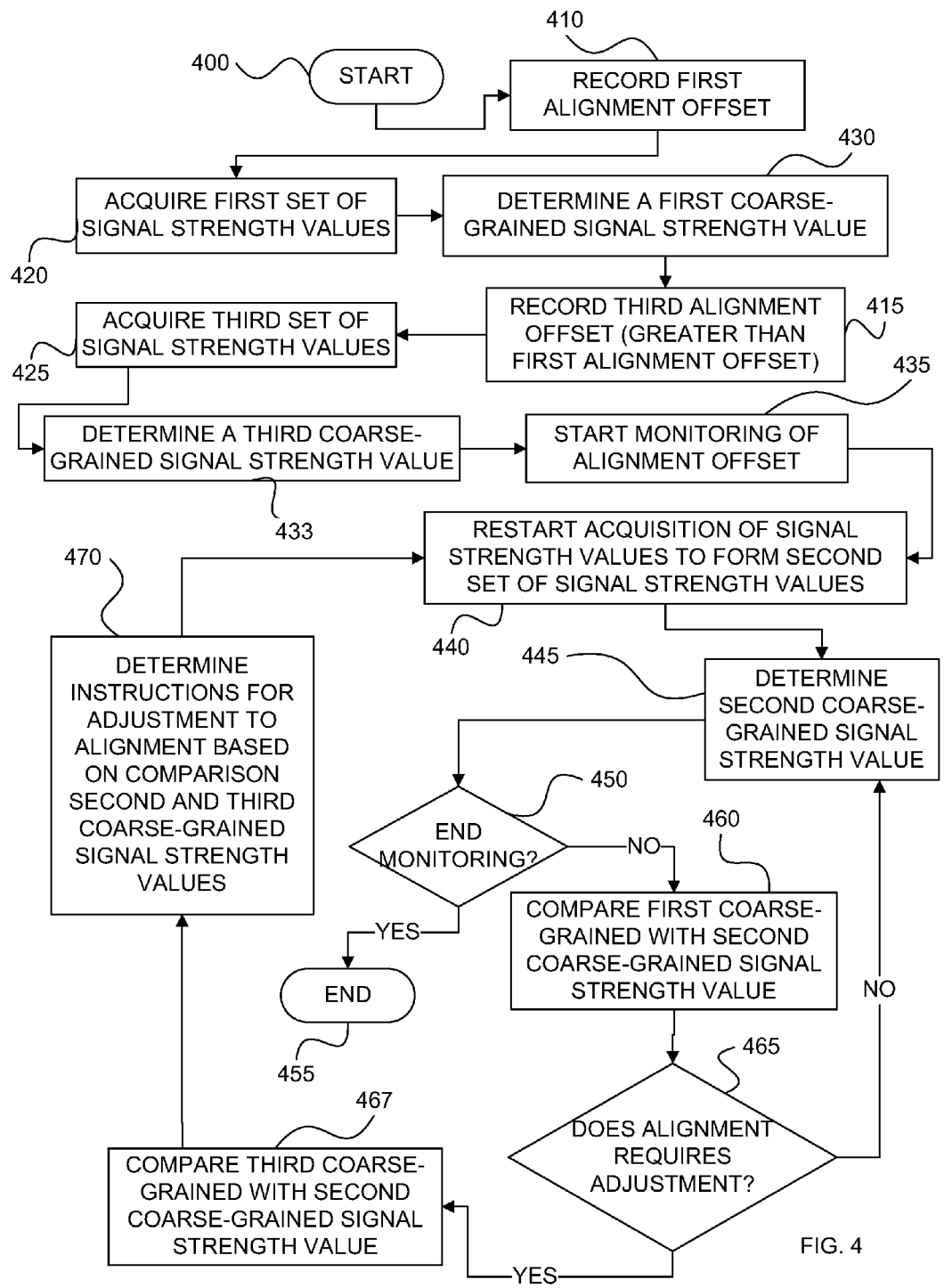
FIG. 4 is another flow chart of an exemplary process of monitoring and controlling alignment, consistent with the present disclosure.

FIG. 4 depicts a further flow chart of an exemplary process of monitoring and/or controlling antenna alignment, consistent with the embodiment depicted in FIG. 1. Again, as discussed in connection with FIGS. 2 and 3, although certain of the steps in FIG. 4 may be depicted herein as being carried out in a particular order, it will be appreciated that the depicted order is in no way limiting of the disclosure or the appended claims. For example, steps 410 and 415 in FIG. 4 relates to recording the known alignment of antenna assembly 101 with a remote source. (Respectively, a "first" alignment offset and a "third" alignment offset that is greater than the first alignment offset.) Although step 410 is depicted as occurring prior to step 420 and step 415 is indicated as after step 420 and before step 425, one would appreciate—consistent with the disclosure—that steps 410 and 415 do not necessarily have to occur in the sequence illustrated in FIG. 4.

In connection with the first set of signal strength values that are acquired in step 420, step 430 relates to determining at least a first coarse-grained signal strength value from the first set of signal strength values. Moreover, in connection with the third set of signal strength values that are acquired in step 425, step 433 relates to determining at least a third coarse-grained signal strength value from the third set of signal strength values.

In a preferred embodiment, steps 410, 415, 420, 425, 430, and 433 occur while antenna assembly 101 is stationary. For example, where antenna subsystem 110 is affixed to a commercial airliner, steps 410, 415, 420, 425, 430, and 433 may be performed when the airliner is at a known geographic location, with a known alignment relative to a remote source of radiofrequency radiation—such as a geostationary satellite.

Step 435 relates to the initiation of alignment offset monitoring. For example, in a preferred embodiment where antenna subsystem 110 is affixed to a commercial airliner, steps 440, 445, 460, 465, 467, and 470 may be performed when the airliner is in transit.

Step 440 relates to the acquisition of a second set of signal strength values. The second set of signal strength values may be acquired and stored in any way suitable for the processing recited in step 445, where a second coarse-grained signal strength value is determined from the second set of signal strength values acquired in step 440.

Step 450, which is part of the loop of steps 440, 445, 460, 465, 467, and 470, simply relates to a decision to cease monitoring. For example, such a decision may be useful for a variety of external reasons—such as after a commercial airliner is no longer in transit.

Step 460 relates to a comparison between the second coarse-grained value derived in step 445 with the first coarse-grained value derived in step 430. In an exemplary embodiment, such a second coarse-grained value may be a cumulative arithmetic average acquired while a commercial plane is in flight as compared against the set of data depicted in FIG. 8.

Step 465 relates to a decision as to whether the comparison indicates that antenna assembly 101 requires an adjustment. As may be determined from the data depicted in FIG. 8, in an exemplary embodiment, such a determination may have a time-dependent feature to it. For example, as has been discussed in connection with FIG. 7, a cumulative arithmetic average RSSI value associated with an overall time period of 60 seconds or less may not reflect the precision necessary to determine whether the alignment offset of 0.0 degrees or 0.2 degrees.

At later cumulative time periods, however, such as 100 seconds, 200 seconds, 300 seconds, 400 seconds, or 500 seconds, a cumulative arithmetic average RSSI value provides the precision necessary to distinguish between 0.0 degrees offset and 0.2 degrees offset.

Following a "NO" determination in step 465, and consistent with the disclosure, processing system 130 may return to step 445 and determine a further coarse-grained signal strength value from the set of values that are being acquired in step 440.

Following a "YES" determination in step 465, and consistent with the disclosure, processing system 130 may then compare the second coarse-grained value derived in step 445 with the third coarse-grained value derived in step 433. In an exemplary embodiment, such a second coarse-grained value may be a cumulative arithmetic average acquired while a commercial plane is in flight as compared against the set of data depicted in FIG. 8.

Such a comparison (step 467) may be used to fine tune any instructions for an adjustment to the alignment, as may be derived in connection with step 470. For example, the first alignment offset recorded in step 410 may have been 0.2 degrees. Consequently, a comparison of the second coarse-grained value with the first coarse-grained value may indicate that the alignment offset is greater than 0.2 degrees. Where there is a third coarse-grained value that reflects an alignment offset greater than 0.2 degrees (such as alignment offset of 0.4 degrees), a comparison of the second coarse-grained value with the third coarse-grained value (step 467) may indicate that the alignment offset is greater than or lesser than 0.4 degrees.

Following such a comparison, particular instructions may be determined to adequately take into account the additional information (step 470). Where such instructions are acted upon, processing system 130 may be configured to initiate a new set of signal strength values to use as the "second set of signal strength values" (i.e., processing system 130 may be configured to "restart" the acquisition of signal strength values for the second set of signal strength values to be used in the loop of steps 440, 445, 460, 465, 467, and 470).

One should appreciate, as well, that the use of additional offset information as described in connection with FIG. 4 may also be incorporated into the flowchart of FIG. 3. For example, either following step 365 or step 390, an embodiment consistent with the disclosure may include a comparison with an additional coarse-grained value associated with an additional alignment offset. Such information can be used to determine the magnitude of the adjustment that may be necessary.

Other embodiments of the invention will be apparent to those skilled in the art from consideration of the specification and practice of the invention disclosed herein. For example, although the disclosure has included embodiments directed to the use of antenna assembly on a commercial plane for purposes of providing in-flight services without interruption, the embodiments disclosed herein may also be used outside the context of in-flight services. For example, the disclosed embodiments permit systems that utilize inertial navigation systems to correct for any "drift" error that may accrue in the inertial navigation system's alignment information. Under operation as disclosed herein, the physical orientation of antenna assembly 101 may be maintained towards a geostationary satellite—this providing an inertial navigation system with independent alignment information.

It is intended that the specification and examples be considered as exemplary only, with a true scope and spirit of the invention being indicated by the following claims. For example, while exemplary embodiments of the present invention described above involve systems configured for use with aircraft, other embodiments may be configured for use with other mobile vehicles such as automobiles and ships. In addition, while embodiments of the present invention described above involves calculating rolling averages of measured RF values, other embodiments may involve other types of computations to arrive at a coarse-grained value. Without limitation, a method or system of generating a coarse-grained value that is derived from a set of signal strength values may embody any arithmetic technique capable of suppressing the effect of high-frequency oscillations in the set of signal-strength values that may be present as a function of time (i.e., capable of "smoothing" a plot of the data set as a function of time). Without limitation, a coarse-grained value may be derived from an averaging technique (i.e., without limitation, an arithmetic average, a geometric average, a statistical median value, weighted averages, sliding averages, and/or a statistical mean value). Further, a coarse-grained value may be derived through a least-squares analysis, and/or may be derived through an analysis of derivatives of the values. Further still, and without limitation, a coarse-grained value may be derived through Fourier analysis, such as through a suppression of high-frequency signal values.

What is claimed is:

1. A method of monitoring alignment, comprising:
    providing an antenna assembly comprising an antenna and a receiver, the antenna configured to couple to radiofrequency radiation transmitted from a radiofrequency signal source, the receiver further coupled to the antenna to generate a plurality of signal strength values associated with the radiofrequency radiation coupled to the antenna, the antenna assembly configured to exhibit an azimuthal alignment relative to a positional axis determined by the antenna assembly and the radiofrequency signal source;
    acquiring a first set of signal strength values from the plurality of signal strength values generated by the receiver at a sampling frequency, wherein the first set of signal strength values are acquired while the antenna assembly is configured to exhibit a first azimuthal alignment magnitude relative to the positional axis, and wherein the sampling frequency has an associated time period;
    generating a first coarse-grained signal strength value from the first set of signal strength values by smoothing at least a first subset of elements of the first set of signal strength values over a coarse-grained time period that is greater than the time period associated with the sampling frequency;
    acquiring a second set of signal strength values from the plurality of signal strength values generated by the receiver at the sampling frequency, wherein the second set of signal strength values are acquired while the antenna assembly is at a second azimuthal alignment magnitude relative to the positional axis;
    generating a second coarse-grained signal strength value from the second set of signal strength values by smoothing at least a second subset of elements of the second set of signal strength values over the coarse-grained time period; and
    comparing the second coarse-grained signal strength value with the first coarse-grained signal strength value and determining whether the second azimuthal alignment magnitude is at least one of: greater than the first azimuthal alignment magnitude, approximately equal to the first azimuthal alignment magnitude, and less than the first azimuthal alignment magnitude;
    wherein the radiofrequency signal source is a geostationary satellite;
    wherein the second subset of elements of the second set of signal strength values are acquired while the antenna assembly is substantially in motion relative to the geostationary satellite; and
    wherein the first subset of elements of the first set of signal strength values are acquired while the antenna assembly is substantially stationary relative to the geostationary satellite.

2. The method of monitoring alignment of claim 1, further comprising:
    acquiring a third set of signal strength values from the plurality of signal strength values generated by the receiver at the sampling frequency, wherein the third set of signal strength values are acquired while the antenna assembly is configured to exhibit a third azimuthal alignment magnitude relative to the positional axis, and wherein the third azimuthal alignment magnitude is at least greater than the first azimuthal alignment magnitude;
    generating a third coarse-grained signal strength value from the third set of signal strength values by smoothing at least a third subset of elements of the third set of signal strength values over the coarse-grained time period; and
    wherein the comparing step further comprises:
    comparing the second coarse-grained signal strength value with the third coarse-grained signal strength value; and
    wherein the determining step further comprises:
    determining whether the second azimuthal alignment magnitude is at least one of:
        greater than the third azimuthal alignment magnitude, approximately equal to the third azimuthal alignment magnitude, and less than the third azimuthal alignment magnitude.

3. The method of monitoring alignment of claim 1, further comprising:
    acquiring a third set of signal strength values from the plurality of signal strength values generated by the receiver at the sampling frequency, wherein the third set of signal strength values are acquired while the antenna assembly is configured to exhibit a third azimuthal alignment magnitude relative to the positional axis, and wherein the third azimuthal alignment magnitude is at least greater than the first azimuthal alignment magnitude;

generating a third coarse-grained signal strength value from the third set of signal strength values by smoothing at least a third subset of elements of the third set of signal strength values over the coarse-grained time period;

generating a fourth coarse-grained signal strength value from the second set of signal strength values by smoothing at least a fourth subset of elements of the second set of signal strength values over the coarse-grained time period; and wherein the comparing step further comprises:

comparing the fourth coarse-grained signal strength value with the third coarse-grained signal strength value; and wherein the determining step further comprises:

determining whether the second azimuthal alignment magnitude is at least one of:

greater than the third azimuthal alignment magnitude, approximately equal to the third azimuthal alignment magnitude, and less than the third azimuthal alignment magnitude.

4. The method of monitoring alignment of claim 2:
wherein the third subset of elements of the third set of signal strength values are acquired while the antenna assembly is substantially stationary relative to the geostationary satellite.

5. The method of monitoring alignment of claim 3:
wherein the third subset of elements of the third set of signal strength values are acquired while the antenna assembly is substantially stationary relative to the geostationary satellite.

6. The method of monitoring alignment of claim 1, further comprising:

generating a first set of coarse-grained signal strength values from the first set of signal strength values by smoothing at least an intermediate subset of elements of the first set of signal strength values over the coarse-grained time period, wherein the first coarse-grained signal strength value is an element of the first set of coarse-grained signal strength values, and the first subset of elements of the first set of signal strength values are also a subset of the intermediate subset of elements of the first set of signal strength values;

wherein each element in the first set of coarse-grained signal strength values has an associated time window, and the first coarse-grained signal strength value has an associated first time window; and calculating a fifth coarse-grained signal strength value using a fifth subset of the intermediate subset, wherein the fifth coarse-grained signal strength value has an associated fifth time window;

wherein the first subset of elements and the fifth subset of the intermediate subset are configured such that there is no element in the first set of coarse-grained signal strength values that has an associated time window that is between the first time window and the fifth time window, and wherein an intersection operation between the first subset of elements and the fifth subset of the intermediate subset yields an empty set.

7. The method of monitoring alignment of claim 1, further comprising:

generating a first set of coarse-grained signal strength values from the first set of signal strength values by smoothing at least an intermediate subset of elements of the first set of signal strength values over the coarse-grained time period, wherein the first coarse-grained signal strength value is an element of the first set of coarse-grained signal strength values, and the first subset of elements of the first set of signal strength values are also a subset of the intermediate subset of elements of the first set of signal strength values;

wherein each element in the first set of coarse-grained signal strength values has an associated time window, and the first coarse-grained signal strength value has an associated first time window; and calculating a fifth coarse-grained signal strength value using a fifth subset of the intermediate subset, wherein the fifth coarse-grained signal strength value has an associated fifth time window;

wherein the first subset of elements and the fifth subset of the intermediate subset are configured such that there is no element in the first set of coarse-grained signal strength values that has an associated time window that is between the first time window and the fifth time window, and wherein an intersection operation between the first subset of elements and the fifth subset of the intermediate subset yields a non-empty set.

8. The method of monitoring alignment of claim 1:
wherein the plurality of signal strength values associated with the radiofrequency radiation coupled to the antenna is a plurality of received signal strength indications.

9. The method of monitoring alignment of claim 1:
wherein the first azimuthal alignment magnitude is approximately 0.2 degrees.

10. The method of monitoring alignment of claim 2:
wherein the third azimuthal alignment magnitude is less than or equal to approximately 0.6 degrees.

11. The method of monitoring alignment of claim 3:
wherein the third azimuthal magnitude alignment is less than or equal to approximately 0.6 degrees.

12. A method of aligning, comprising:
monitoring alignment according to the method of claim 1;
providing a controller, responsive to alignment instructions, configured to cause the antenna assembly to exhibit a provisional azimuthal alignment magnitude relative to the positional axis that is different from the second azimuthal alignment magnitude;

wherein, if it is determined that the second azimuthal alignment magnitude is greater than the first azimuthal alignment magnitude, providing alignment instructions to the controller configured to cause the antenna assembly to exhibit the provisional azimuthal alignment magnitude.

13. The method of aligning of claim 12 further comprising:
providing an inertial information system configured to generate information associated with an azimuthal alignment magnitude relative to the positional axis while the antenna assembly is substantially in motion relative to the geostationary satellite.

14. An alignment system, comprising:
an antenna assembly comprising an antenna and a receiver, the antenna configured to couple to radiofrequency radiation transmitted from a radiofrequency signal source, the receiver further coupled to the antenna to generate a plurality of signal strength values associated with the radiofrequency radiation coupled to the antenna, the antenna assembly configured to exhibit an azimuthal alignment relative to a positional axis determined by the antenna assembly and the radiofrequency signal source;

a coarse-grained calculator configured to acquire a first set of signal strength values from the plurality of signal strength values generated by the receiver at a sampling frequency and to generate at least a first coarse-grained signal strength value by smoothing at least a first subset of elements of the first set of signal strength values over a coarse-grained time period, wherein the first set of signal strength values are generated by the receiver while the antenna assembly is at a first azimuthal alignment magnitude relative to the positional axis; and an alignment calculator configured to use the first coarse-grained signal strength value and a predetermined coarse-grained signal strength value to generate a first measure that the first azimuthal alignment magnitude is at least one of: less than a predetermined azimuthal alignment magnitude relative to the positional axis, approximately equal to the predetermined azimuthal alignment magnitude, and greater than the predetermined azimuthal alignment magnitude;

wherein the radiofrequency signal source is a geostationary satellite;

wherein the coarse-grained calculator is further configured to acquire a second set of signal strength values from the plurality of signal strength values generated by the receiver at the sampling frequency and to generate at least the predetermined coarse-grained signal strength value by smoothing at least a second subset of elements of the second set of signal strength values over the coarse-grained time period, wherein the second set of signal strength values are generated by the receiver while the antenna assembly is at the predetermined azimuthal alignment magnitude;

wherein the first subset of elements of the first set of signal strength values are acquired while the antenna assembly is substantially in motion relative to the geostationary satellite; and wherein the second subset of elements of the second set of signal strength values are acquired while the antenna assembly is substantially stationary relative to the geostationary satellite.

15. The alignment system of claim 14, further comprising:
a memory configured to store the predetermined coarse-grained signal strength value.

16. The alignment system of claim 15,
wherein the alignment calculator is further configured to acquire the predetermined coarse-grained signal strength value from the memory.

17. The alignment system of claim 14,
wherein the coarse-grained calculator is further configured to acquire a third set of signal strength values from the plurality of signal strength values generated by the receiver at the sampling frequency and to generate at least a third coarse-grained signal strength value by smoothing at least a third subset of elements of the third set of signal strength values over the coarse-grained time period, wherein the third set of signal strength values are generated by the receiver while the antenna assembly is at a third azimuthal alignment magnitude relative to the positional axis; and wherein the alignment calculator is further configured to use the third coarse-grained signal strength value and generate a third measure that the first azimuthal alignment magnitude is at least one of: less than the third azimuthal alignment magnitude, approximately equal to the third azimuthal alignment magnitude, and greater than the third azimuthal alignment magnitude.

18. The alignment system of claim 17,
wherein the coarse-grained calculator is further configured to acquire a fourth set of signal strength values from the plurality of signal strength values generated by the receiver at the sampling frequency and to generate at least a fourth coarse-grained signal strength value by smoothing at least a fourth subset of elements of the fourth set of signal strength values over the coarse-grained time period, wherein the fourth set of signal strength values are generated by the receiver while the antenna assembly is at the first azimuthal alignment magnitude; and wherein the alignment calculator generates the third measure also using the fourth coarse-grained signal strength.

19. The alignment system of claim 17,
wherein the third subset of elements of the third set of signal strength values are acquired while the antenna assembly is substantially stationary relative to the geostationary satellite.

20. The alignment system of claim 18,
wherein the third subset of elements of the third set of signal strength values are acquired while the antenna assembly is substantially stationary relative to the geostationary satellite; and wherein the fourth subset of elements of the fourth set of signal strength values are acquired while the antenna assembly is substantially in motion relative to the geostationary satellite.

21. The alignment system of claim 14,
wherein the coarse-grained calculator is further configured to generate a first set of coarse-grained signal strength values from the first set of signal strength values by smoothing at least an intermediate subset of elements of the first set of signal strength values over the coarse-grained time period, wherein the first coarse-grained signal strength value is an element of the first set of coarse-grained signal strength values, and the first coarse-grained signal strength value is derived from a first subset of the intermediate subset of elements;

wherein each element in the first set of coarse-grained signal strength values has an associated time window, and the first coarse-grained signal strength value has an associated first time window;

wherein the coarse-grained calculator is further configured to generate a second coarse-grained signal strength value, wherein the second coarse-grained signal strength value is an element of the first set of coarse-grained signal strength values, wherein the second coarse-grained signal strength value is derived from a second subset of the intermediate subset of elements, and wherein the second coarse-grained signal strength value has an associated second time window; and wherein the coarse-grained calculator is configured such that there is no element in the first set of coarse-grained signal strength values that has an associated time window that is between the first time window and the second time window, and wherein an intersection operation between the first subset of the intermediate subset of elements and the second subset of the intermediate subset of elements yields an empty set.

22. The alignment system of claim 14,
wherein the coarse-grained calculator is further configured to generate a first set of coarse-grained signal strength values from the first set of signal strength values by smoothing at least an intermediate subset of elements of the first set of signal strength values over the coarse-grained time period, wherein the first coarse-grained signal strength value is an element of the first set of coarse-grained signal strength values, and the first coarse-grained signal strength value is derived from a first subset of the intermediate subset of elements;

wherein each element in the first set of coarse-grained signal strength values has an associated time window, and the first coarse-grained signal strength value has an associated first time window;

wherein the coarse-grained calculator is further configured to generate a second coarse-grained signal strength value, wherein the second coarse-grained signal strength value is an element of the first set of coarse-grained signal strength values, wherein the second coarse-grained signal strength value is derived from a second subset of the intermediate subset of elements, and wherein the second coarse-grained signal strength value has an associated second time window; and wherein the coarse-grained calculator is configured such that there is no element in the first set of coarse-grained signal strength values that has an associated time window that is between the first time window and the second time window, and wherein an intersection operation between the first subset of the intermediate subset of elements and the second subset of the intermediate subset of elements yields a non-empty set.

23. The alignment system of claim 14,
wherein the plurality of signal strength values associated with the radiofrequency radiation coupled to the antenna is a plurality of received signal strength indications.

24. The alignment system of claim 14,
wherein the predetermined azimuthal alignment magnitude is approximately 0.2 degrees.

25. The alignment system of claim 17,
wherein the third azimuthal alignment magnitude is less than or equal to approximately 0.6 degrees.

26. The alignment system of claim 18,
wherein the third azimuthal alignment magnitude is less than or equal to approximately 0.6 degrees.

27. The alignment system of claim 14, further comprising:
a controller, responsive to alignment instructions, configured to cause the antenna assembly to exhibit a provisional azimuthal alignment magnitude relative to the positional axis that is different from the first azimuthal alignment magnitude;
wherein, if it is determined that the first azimuthal alignment magnitude is greater than the predetermined azimuthal alignment magnitude, providing alignment instructions to the controller configured to cause the antenna assembly to exhibit the provisional azimuthal alignment magnitude.

28. The alignment system of claim 27, further comprising:
an inertial information system configured to generate information associated with an azimuthal alignment magnitude relative to the positional axis while the antenna assembly is substantially in motion relative to the geostationary satellite.

29. A non-transitory computer-readable storage medium including instructions, executable by a processor, for performing a method of monitoring alignment in an antenna assembly,
wherein the antenna assembly comprises an antenna and a receiver, the antenna configured to couple to radiofrequency radiation transmitted from a radiofrequency signal source, the receiver further coupled to the antenna to generate a plurality of signal strength values associated with the radiofrequency radiation coupled to the antenna, the antenna assembly configured to exhibit an azimuthal alignment relative to a positional axis determined by the antenna assembly and the radiofrequency signal source, the method of monitoring alignment comprising:

acquiring a first set of signal strength values from the plurality of signal strength values generated by the receiver at a sampling frequency, wherein the first set of signal strength values are acquired while the antenna assembly is configured to exhibit a first azimuthal alignment magnitude relative to the positional axis, and wherein the sampling frequency has an associated time period;

generating a first coarse-grained signal strength value from the first set of signal strength values by smoothing at least a first subset of elements of the first set of signal strength values over a coarse-grained time period that is greater than the time period associated with the sampling frequency;

acquiring a second set of signal strength values from the plurality of signal strength values generated by the receiver at the sampling frequency, wherein the second set of signal strength values are acquired while the antenna assembly is at a second azimuthal alignment magnitude relative to the positional axis;

generating a second coarse-grained signal strength value from the second set of signal strength values by smoothing at least a second subset of elements of the second set of signal strength values over the coarse-grained time period; and comparing the second coarse-grained signal strength value with the first coarse-grained signal strength value and determining whether the second azimuthal alignment magnitude is at least one of: greater than the first azimuthal alignment magnitude, approximately equal to the first azimuthal alignment magnitude, and less than the first azimuthal alignment magnitude;

wherein the radiofrequency signal source is a geostationary satellite;

wherein the second subset of elements of the second set of signal strength values are acquired while the antenna assembly is substantially in motion relative to the geostationary satellite; and wherein the first subset of elements of the first set of signal strength values are acquired while the antenna assembly is substantially stationary relative to the geostationary satellite.

30. The non-transitory computer-readable storage medium of claim 29,
wherein the method of monitoring alignment further comprises:
acquiring a third set of signal strength values from the plurality of signal strength values generated by the receiver at the sampling frequency, wherein the third set of signal strength values are acquired while the antenna assembly is configured to exhibit a third azimuthal alignment magnitude relative to the positional axis, and wherein the third azimuthal alignment magnitude is at least greater than the first azimuthal alignment magnitude;
generating a third coarse-grained signal strength value from the third set of signal strength values by smoothing at least a third subset of elements of the third set of signal strength values over the coarse-grained time period; and
wherein the comparing step further comprises:
comparing the second coarse-grained signal strength value with the third coarse-grained signal strength value; and
wherein the determining step further comprises:
determining whether the second azimuthal alignment magnitude is at least one of:

greater than the third azimuthal alignment magnitude, approximately equal to the third azimuthal alignment magnitude, and less than the third azimuthal alignment magnitude.

31. The non-transitory computer-readable storage medium of claim 29,
wherein the method of monitoring alignment further comprises:
acquiring a third set of signal strength values from the plurality of signal strength values generated by the receiver at the sampling frequency, wherein the third set of signal strength values are acquired while the antenna assembly is configured to exhibit a third azimuthal alignment magnitude relative to the positional axis, and wherein the third azimuthal alignment magnitude is at least greater than the first azimuthal alignment magnitude;
generating a third coarse-grained signal strength value from the third set of signal strength values by smoothing at least a third subset of elements of the third set of signal strength values over the coarse-grained time period;
generating a fourth coarse-grained signal strength value from the second set of signal strength values by smoothing at least a fourth subset of elements of the second set of signal strength values over the coarse-grained time period; and
wherein the comparing step further comprises:
comparing the fourth coarse-grained signal strength value with the third coarse-grained signal strength value; and
wherein the determining step further comprises:
determining whether the second azimuthal alignment magnitude is at least one of:
greater than the third azimuthal alignment magnitude, approximately equal to the third azimuthal alignment magnitude, and less than the third azimuthal alignment magnitude.

32. The non-transitory computer-readable storage medium of claim 30,
wherein the third subset of elements of the third set of signal strength values are acquired while the antenna assembly is substantially stationary relative to the geostationary satellite.

33. The non-transitory computer-readable storage medium of claim 31,
wherein the third subset of elements of the third set of signal strength values are acquired while the antenna assembly is substantially stationary relative to the geostationary satellite; and
wherein the fourth subset of elements of the fourth set of signal strength values are acquired while the antenna assembly is substantially in motion relative to the geostationary satellite.

34. The non-transitory computer-readable storage medium of claim 29,
wherein the method of monitoring alignment further comprises:
generating a first set of coarse-grained signal strength values from the first set of signal strength values by smoothing at least an intermediate subset of elements of the first set of signal strength values over the coarse-grained time period, wherein the first coarse-grained signal strength value is an element of the first set of coarse-grained signal strength values, and the first subset of elements of the first set of signal strength values are also a subset of the intermediate subset of elements of the first set of signal strength values;
wherein each element in the first set of coarse-grained signal strength values has an associated time window, and the first coarse-grained signal strength value has an associated first time window; and
calculating a fifth coarse-grained signal strength value using a fifth subset of the intermediate subset, wherein the fifth coarse-grained signal strength value has an associated fifth time window;
wherein the first subset of elements and the fifth subset of the intermediate subset are configured such that there is no element in the first set of coarse-grained signal strength values that has an associated time window that is between the first time window and the fifth time window, and wherein an intersection operation between the first subset of elements and the fifth subset of the intermediate subset yields an empty set.

35. The non-transitory computer-readable storage medium of claim 29,
wherein the method of monitoring alignment further comprises:
generating a first set of coarse-grained signal strength values from the first set of signal strength values by smoothing at least an intermediate subset of elements of the first set of signal strength values over the coarse-grained time period, wherein the first coarse-grained signal strength value is an element of the first set of coarse-grained signal strength values, and the first subset of elements of the first set of signal strength values are also a subset of the intermediate subset of elements of the first set of signal strength values;
wherein each element in the first set of coarse-grained signal strength values has an associated time window, and the first coarse-grained signal strength value has an associated first time window; and
calculating a fifth coarse-grained signal strength value using a fifth subset of the intermediate subset, wherein the fifth coarse-grained signal strength value has an associated fifth time window;
wherein the first subset of elements and the fifth subset of the intermediate subset are configured such that there is no element in the first set of coarse-grained signal strength values that has an associated time window that is between the first time window and the fifth time window, and wherein an intersection operation between the first subset and the fifth subset yields a non-empty set.

36. The non-transitory computer-readable storage medium of claim 29,
wherein the plurality of signal strength values associated with the radiofrequency radiation coupled to the antenna is a plurality of received signal strength indications.

37. The non-transitory computer-readable storage medium of claim 29,
wherein the first azimuthal alignment magnitude is approximately 0.2 degrees.

38. The non-transitory computer-readable storage medium of claim 30,
wherein the third azimuthal alignment magnitude is less than or equal to approximately 0.6 degrees.

39. The non-transitory computer-readable storage medium of claim 31,
wherein the third azimuthal alignment magnitude is less than or equal to approximately 0.6 degrees.

40. The non-transitory computer-readable storage medium of claim 29,
wherein the antenna assembly further comprises a controller, responsive to alignment instructions, configured to cause the antenna assembly to exhibit a provisional azimuthal alignment magnitude relative to the positional axis that is different from the second azimuthal alignment magnitude;

the computer-readable storage medium further comprising instructions, executable by the processor, for performing a method of aligning, the method of aligning comprising:

providing alignment instructions to the controller configured to cause the antenna assembly to exhibit the provisional azimuthal alignment magnitude if it is determined that the second azimuthal alignment magnitude is greater than the first azimuthal alignment magnitude.

41. The non-transitory computer-readable storage medium of claim 40, wherein the antenna assembly further comprises an inertial information system configured to generate information associated with an azimuthal alignment magnitude relative to the positional axis while the antenna assembly is in motion.

42. A method of monitoring alignment, comprising:

generating a first coarse-grained signal strength value from a first set plurality of signal strength values by smoothing at least a first subset of elements of the first set of signal strength values over a coarse-grained time period while an antenna assembly is configured to exhibit a first azimuthal alignment magnitude relative to a positional axis;

generating a second coarse-grained signal strength value from a second set of signal strength values by smoothing at least a second subset of elements of the second set of signal strength values over the coarse-grained time period while the antenna assembly is configured to exhibit a second azimuthal alignment magnitude relative to the positional axis; and comparing the second coarse-grained signal strength value with the first coarse-grained signal strength value and determining whether the second azimuthal alignment magnitude is at least one of: greater than the first azimuthal alignment magnitude, approximately equal to the first azimuthal alignment magnitude, and less than the first azimuthal alignment magnitude;

wherein the antenna assembly comprises an antenna and a receiver, the antenna configured to couple to radiofrequency radiation transmitted from a radiofrequency signal source, the receiver further coupled to the antenna to generate the first set of signal strength values associated with the radiofrequency radiation coupled to the antenna and to generate the second set of signal strength values associated with the radiofrequency radiation coupled to the antenna, the antenna assembly configured to exhibit an azimuthal alignment relative to the positional axis determined by the antenna assembly and the radiofrequency signal source;

wherein the radiofrequency signal source is a geostationary satellite;

wherein the first subset of elements of the first set of signal strength values are acquired while the antenna assembly is substantially in motion relative to the geostationary satellite; and where the second subset of elements of the second set of signal strength values are acquired while the antenna assembly is substantially stationary relative to the geostationary satellite.

43. The method of monitoring alignment of claim 42, wherein the first coarse-grained signal strength value is generated by filtering a set of high-frequency contributions from the first set of signal strength values; and wherein the second coarse-grained signal strength value is generated by filtering the set of high-frequency contributions from the second set of signal strength values.

44. A method of aligning, comprising:

monitoring alignment according to the method of claim 42;

wherein, if it is determined that the second azimuthal alignment magnitude is greater than the first azimuthal alignment magnitude, providing alignment instructions to a controller configured to cause the antenna assembly to exhibit a provisional azimuthal alignment magnitude, where the provisional azimuthal alignment magnitude is less than the magnitude second azimuthal alignment magnitude; and wherein the controller, responsive to alignment instructions, is configured to cause the antenna assembly to exhibit the provisional azimuthal alignment magnitude relative to the positional axis that is different from the second azimuthal alignment magnitude.

45. An alignment system, comprising:

an antenna assembly comprising an antenna and a receiver, the antenna configured to couple to radiofrequency radiation transmitted from a radiofrequency signal source, the receiver further coupled to the antenna to generate a plurality of signal strength values associated with the radiofrequency radiation coupled to the antenna, the antenna assembly configured to exhibit an azimuthal alignment relative to a positional axis determined by the antenna assembly and the radiofrequency signal source;

a coarse-grained calculator configured to generate at least a first coarse-grained signal strength value from the plurality of signal strength values as a function of time while the antenna assembly is at a first azimuthal alignment magnitude relative to the positional axis; and an alignment calculator configured to use the first coarse-grained signal strength value and a predetermined coarse-grained signal strength value to generate a first measure that the first azimuthal alignment magnitude is at least one of: less than a predetermined azimuthal alignment magnitude relative to the positional axis, approximately equal to the predetermined azimuthal alignment magnitude, and greater than the predetermined azimuthal alignment magnitude;

wherein the radiofrequency signal source is a geostationary satellite;

wherein the coarse-grained calculator is further configured to acquire a second set of signal strength values from the plurality of signal strength values and to generate at least the predetermined coarse-grained signal strength value, wherein the second set of signal strength values are generated by the receiver while the antenna assembly is at the predetermined azimuthal alignment magnitude;

wherein the antenna assembly is substantially in motion relative to the geostationary satellite while the antenna assembly is at the first azimuthal alignment magnitude relative to the positional axis; and wherein the antenna assembly is substantially stationary relative to the geostationary satellite while the antenna assembly is at the predetermined azimuthal alignment magnitude.

46. The alignment system claim 45, wherein the first coarse-grained signal strength value is generated by filtering the set of high-frequency contributions from the plurality of signal strength values.

47. A non-transitory computer-readable storage medium including instructions, executable by a processor, for performing a method of monitoring alignment in an antenna assembly,
wherein the antenna assembly comprises an antenna and a receiver, the antenna configured to couple to radiofrequency radiation transmitted from a radiofrequency signal source, the receiver further coupled to the antenna to generate a plurality of signal strength values associated with the radiofrequency radiation coupled to the antenna, the antenna assembly configured to exhibit an azimuthal alignment relative to a positional axis determined by the antenna assembly and the radiofrequency signal source, the method of monitoring alignment comprising:
generating a first coarse-grained signal strength value from the plurality of signal strength values while an antenna assembly is configured to exhibit a first azimuthal alignment magnitude relative to a positional axis;
generating a second coarse-grained signal strength value from the plurality of signal strength values while the antenna assembly is configured to exhibit a second azimuthal alignment magnitude relative to the positional axis; and
comparing the second coarse-grained signal strength value with the first coarse-grained signal strength value and determining whether the second azimuthal alignment magnitude is at least one of: greater than the first azimuthal alignment magnitude, approximately equal to the first azimuthal alignment magnitude, and less than the first azimuthal alignment magnitude;
wherein the radiofrequency signal source is a geostationary satellite;
wherein the antenna assembly is substantially stationary relative to the geostationary satellite while the antenna assembly is at the first azimuthal alignment magnitude relative to the positional axis; and
wherein the antenna assembly is substantially in motion relative to the geostationary satellite while the antenna assembly is at the second azimuthal alignment magnitude.

48. The non-transitory computer-readable storage medium of claim 47,
wherein the first coarse-grained signal strength value is generated by filtering a set of high-frequency contributions from the plurality of signal strength values; and
wherein the second coarse-grained signal strength value is generated by filtering the set of high-frequency contributions from the plurality of signal strength values.

49. An alignment system, comprising:
an antenna assembly comprising an antenna and a modem, the antenna configured to couple to radiofrequency radiation transmitted from a radiofrequency signal source, the modem further coupled to the antenna to generate a plurality of received signal strength values associated with the radiofrequency radiation coupled to the antenna, the antenna assembly configured to exhibit an azimuthal alignment relative to a positional axis determined by the antenna assembly and the radiofrequency signal source;
a coarse-grained calculator configured to generate at least a first coarse-grained signal strength value from the plurality of received signal strength values associated with the antenna assembly at a first azimuthal alignment magnitude relative to the positional axis; and
an alignment calculator configured to use the first coarse-grained signal strength value and a predetermined coarse-grained signal strength value to generate a first measure that the first azimuthal alignment magnitude is at least one of: less than a predetermined azimuthal alignment magnitude relative to the positional axis, approximately equal to the predetermined azimuthal alignment magnitude, and greater than the predetermined azimuthal alignment magnitude;
wherein the radiofrequency signal source is a geostationary satellite;
wherein the coarse-grained calculator is further configured to acquire a second set of signal strength values from the plurality of signal strength values and to generate at least the predetermined coarse-grained signal strength value, wherein the second set of signal strength values are generated by the receiver while the antenna assembly is at the predetermined azimuthal alignment magnitude;
wherein the antenna assembly is substantially in motion relative to the geostationary satellite while the antenna assembly is at the first azimuthal alignment magnitude relative to the positional axis; and
wherein the antenna assembly is substantially stationary relative to the geostationary satellite while the antenna assembly is at the predetermined azimuthal alignment magnitude.

* * * * *